United States Patent
Liu et al.

(10) Patent No.: US 12,342,230 B2
(45) Date of Patent: Jun. 24, 2025

(54) SWITCHING METHOD AND COMMUNICATION APPARATUS

(71) Applicant: HUAWEI TECHNOLOGIES CO., LTD., Shenzhen (CN)

(72) Inventors: Jia Liu, Shanghai (CN); Chaoyi Yan, Dongguan (CN); Siduo Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 552 days.

(21) Appl. No.: 17/576,240

(22) Filed: Jan. 14, 2022

(65) Prior Publication Data

US 2022/0141750 A1    May 5, 2022

Related U.S. Application Data

(63) Continuation of application No. PCT/CN2020/101649, filed on Jul. 13, 2020.

(30) Foreign Application Priority Data

Jul. 15, 2019 (CN) .................. 201910636713.X

(51) Int. Cl.
*H04W 36/00* (2009.01)
*H04W 36/08* (2009.01)
*H04W 36/30* (2009.01)

(52) U.S. Cl.
CPC . *H04W 36/00837* (2018.08); *H04W 36/0007* (2018.08); *H04W 36/0058* (2018.08); *H04W 36/08* (2013.01); *H04W 36/304* (2023.05)

(58) Field of Classification Search
CPC ............. H04W 36/30; H04W 36/0007; H04W 36/0058; H04W 36/00837
See application file for complete search history.

(56) References Cited

U.S. PATENT DOCUMENTS

| | | | | |
|---|---|---|---|---|
| 9,185,620 | B2 * | 11/2015 | Khoryaev | ............... H04N 21/24 |
| 2009/0227209 | A1 * | 9/2009 | Craig | ...................... H04L 1/003 |
| | | | | 455/67.13 |

(Continued)

FOREIGN PATENT DOCUMENTS

| CN | 102572913 A | 7/2012 |
|---|---|---|
| CN | 104412654 A | 3/2015 |

(Continued)

OTHER PUBLICATIONS

Ericsson, Conditional Handover Execution in Nr. 3GPP TSG RAN WG2 #106, Reno, US, May 13-17, 2019, R2-1906212, 5 pages.

(Continued)

*Primary Examiner* — Keith Ferguson
(74) *Attorney, Agent, or Firm* — HAUPTMAN HAM, LLP

(57) ABSTRACT

A switching method includes receiving, by a source network device, N pieces of data channel quality information. The N pieces of data channel quality information are in a one-to-one correspondence with N candidate network devices. Each of the N pieces of data channel quality information is used to indicate coverage quality of a data channel between a terminal device and a candidate network device corresponding to the data channel quality information. N is an integer greater than or equal to 1. The method also includes determining, by the source network device, based on the N pieces of data channel quality information, one of the N candidate network devices as a target network device to which the terminal device is to be switched from the source network device.

11 Claims, 10 Drawing Sheets

(56) References Cited

U.S. PATENT DOCUMENTS

| | | | |
|---|---|---|---|
| 2013/0260762 A1* | 10/2013 | Tomita | H04W 36/304 455/436 |
| 2015/0358881 A1 | 12/2015 | Cui et al. | |
| 2016/0135104 A1* | 5/2016 | Lau | H04W 36/304 455/436 |
| 2017/0273069 A1 | 9/2017 | Tenny et al. | |
| 2018/0332520 A1 | 11/2018 | Cheng et al. | |
| 2020/0068457 A1 | 2/2020 | You et al. | |

FOREIGN PATENT DOCUMENTS

| | | |
|---|---|---|
| CN | 107733497 A | 2/2018 |
| CN | 107889145 A | 4/2018 |
| CN | 108810931 A | 11/2018 |
| CN | 109151923 A | 1/2019 |
| CN | 109429261 A | 3/2019 |
| WO | 2018083649 A1 | 5/2018 |
| WO | 2018128187 A1 | 7/2018 |
| WO | 2018175891 A1 | 9/2018 |
| WO | 2018201990 A1 | 11/2018 |

OTHER PUBLICATIONS

Hu Liujun, Research on Ultra Dense Networks (UDN) Technologies for 5G Mobile Networks. University of Electronic Science and Technology of China, Mar. 30, 2019, 3 pages.

3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.

Ericsson, Triggering of Conditional Handover in NR. 3GPP TSG RAN WG2 #106, Reno, US, May 13-17, 2019, R2-1906211, 7 pages.

International Search Report issued in corresponding International Application No. PCT/CN2020/101649, dated Oct. 15, 2020, pp. 1-9.

Chinese Office Action issued in corresponding Chinese Application No. 201910636713.X, dated May 6, 2021, pp. 1-9.

Huawei, HiSilicon, Measurement configuration and procedures for SS and CSI-RS. 3GPP TSG-RAN WG2 #99, Berlin, Germany, Aug. 21-25, 2017, R2-1708214, 6 pages.

Extended European Search Report issued in corresponding European Application No. 20839901.4, dated Aug. 2, 2022, pp. 1-14.

* cited by examiner

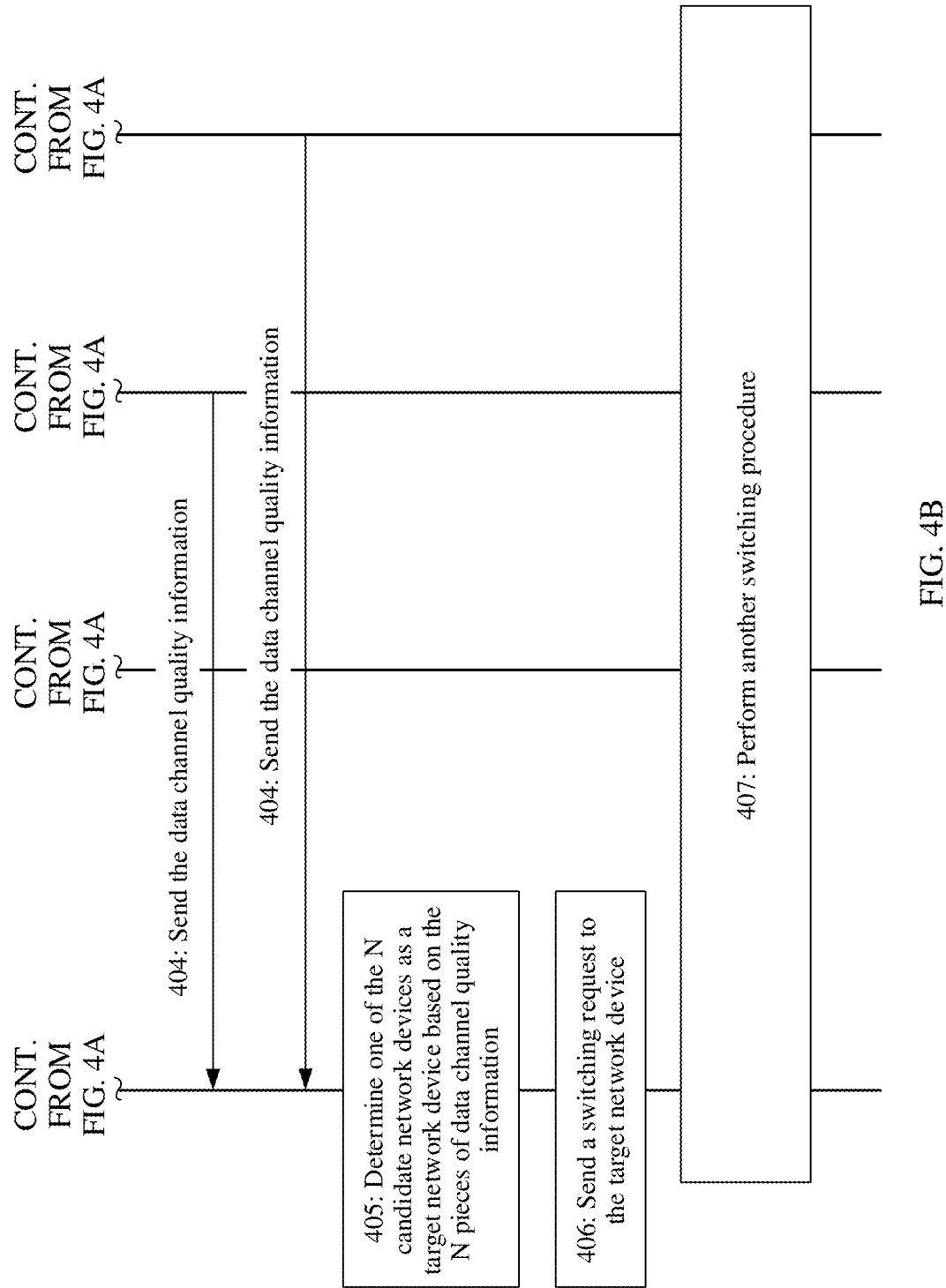

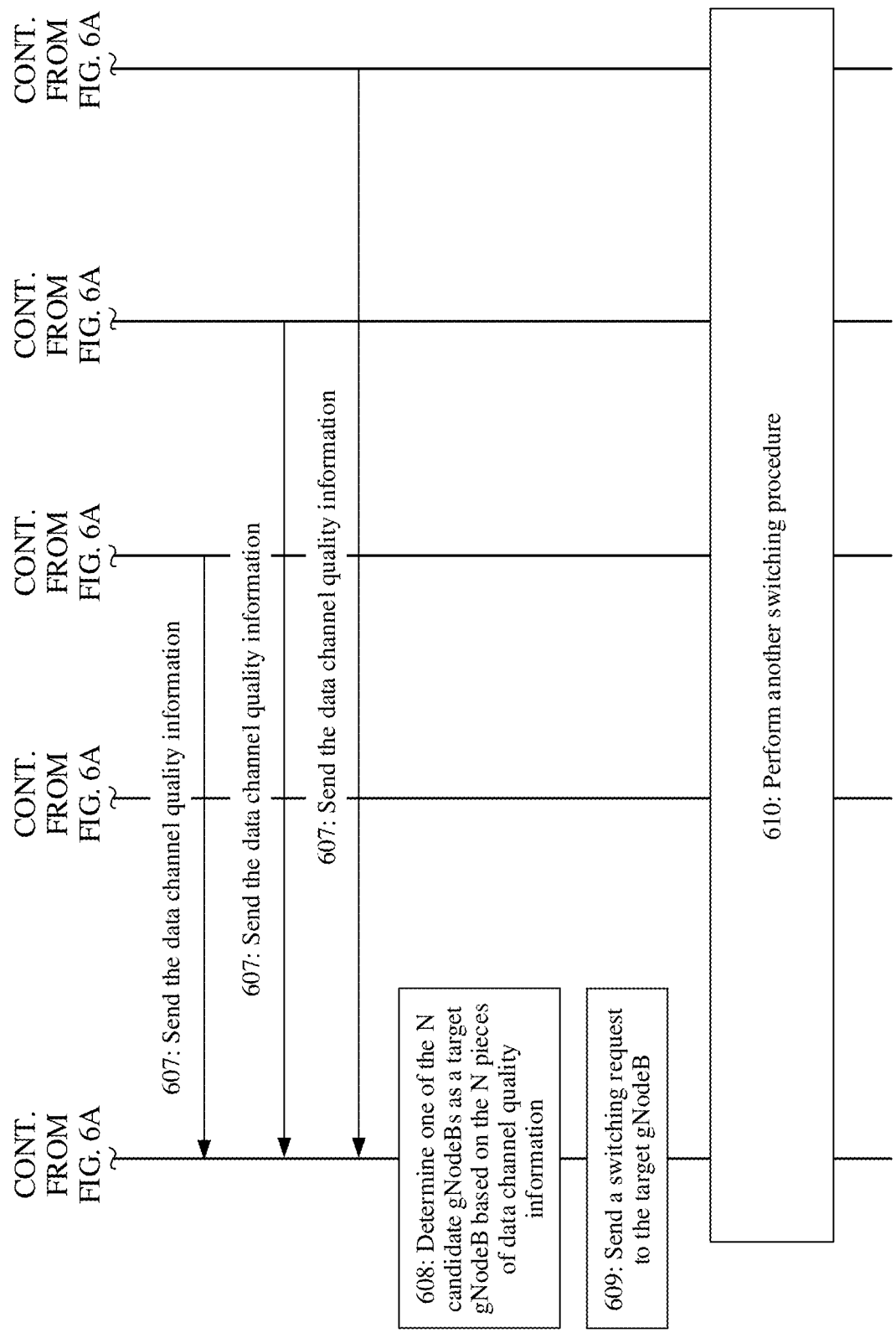

SWITCHING METHOD AND COMMUNICATION APPARATUS

CROSS-REFERENCE TO RELATED APPLICATIONS

This application is a continuation of International Application No. PCT/CN2020/101649, filed on Jul. 13, 2020, which claims priority to Chinese Patent Application No. 201910636713.X, filed on Jul. 15, 2019. The disclosures of the aforementioned applications are hereby incorporated by reference in their entireties.

TECHNICAL FIELD

Embodiments of this application relate to the communication field, and in particular, to a switching method and a communication apparatus.

BACKGROUND

With increasing development of communication technologies and diversification of communication services, a service data volume of a user increases, and the user has an increasingly high requirement on a network speed. To meet the requirement of the user, an operator continuously improves a capability of a network device, and continuously expands a network solution, to increase data transmission rates of various services of the user.

After a terminal device establishes communication with a base station (namely, a source network device), due to coverage, load, a service, or another factor (where for example, a signal becomes weak because the terminal device moves to an edge of cell coverage, or load of a current serving cell of the terminal device is heavy), the terminal device may be switched from the current base station (namely, the source network device) to a target base station (namely, a target network device). After the terminal device is switched to the target base station, the target base station can maintain communication with the terminal device, and continue to serve the terminal. However, after the switching, a throughput and a service rate that are of radio resources provided by the target base station may not meet a requirement of the terminal device. Consequently, better experience cannot be provided for the user.

SUMMARY

Embodiments of this application provide a switching method and a related device. A target network device that can better meet a communication requirement of a terminal device is determined by using a source network device, so that a throughput and a service rate that are of radio resources of the terminal device can be improved after the terminal device is switched to the target network device.

According to a first aspect, an embodiment of this application provides a switching method. In this method, to sift a target network device meeting a communication requirement of a terminal device for the terminal device, a source network device receives N pieces of data channel quality information, where the N pieces of data channel quality information are in a one-to-one correspondence with N candidate network devices, and each of the N pieces of data channel quality information is used to indicate coverage quality of a data channel between the terminal device and a candidate network device corresponding to the data channel quality information. Therefore, the source network device may sift, based on the N pieces of data channel quality information and according to a specific rule, one candidate network device from the N candidate network devices as the target network device, so that after the terminal device is switched to the target network device, the communication requirement of the terminal device can be met, and a throughput and a service rate that are of radio resources of the terminal device can be improved.

In this embodiment, because there are usually a plurality of candidate network devices near the source network device, N is an integer greater than or equal to 1.

In this embodiment of this application, the source network device may determine the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet the communication requirement of the terminal device, so that the service rate of the terminal device can be improved.

According to the first aspect, in a first implementation of the first aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the first aspect or the first implementation of the first aspect, in a second implementation of the first aspect of this embodiment of this application, that a source network device receives N pieces of data channel quality information includes: The source network device receives the N pieces of data channel quality information from the terminal device.

In this implementation, a source of the data channel quality information received by the source network device is determined. Because the source network device receives the data channel quality information from the terminal device, it may be inferred that the data channel quality information is obtained by the terminal device by measuring a reference signal of the candidate network device.

According to the second implementation of the first aspect, in a third implementation of the first aspect of this embodiment of this application, each of the N pieces of data channel quality information is obtained by the terminal device by measuring a first reference signal of a candidate network device corresponding to the data channel quality information.

In this implementation, it is determined that the reference signal measured by the terminal device is the first reference signal of the candidate network device. Therefore, a method for obtaining the data channel quality information by the terminal device is determined.

According to the third implementation of the first aspect, in a fourth implementation of the first aspect of this embodiment of this application, the first reference signal is a channel state information reference signal CSI-RS, and each of the N pieces of data channel quality information includes at least one of a reference signal received power RSRP value of the CSI-RS, a reference signal received quality RSRQ value of the CSI-RS, and a signal to interference plus noise ratio SINR value of the CSI-RS.

In this implementation, a specific implementation of the first reference signal and a specific implementation of the data channel quality information are proposed. The first reference signal is the CSI-RS, and a measurement result of the CSI-RS signal of the candidate network device by the terminal device is at least one of the reference signal received power RSRP value of the CSI-RS, the reference signal received quality RSRQ value of the CSI-RS, and the signal to interference plus noise ratio SINR value of the CSI-RS. Because the measurement result of the CSI-RS signal of the candidate network device has diversity, a sifting result of determining the target network device by the source network device also varies.

According to the fourth implementation of the first aspect, in a fifth implementation of the first aspect of this embodiment of this application, each of the N pieces of data channel quality information is any one of the RSRP value of the CSI-RS, the RSRQ value of the CSI-RS, and the SINR value of the CSI-RS; and that the source network device determines one of the N candidate network devices as the target network device based on the N pieces of data channel quality information includes: The source network device determines that one network device in at least one candidate network device corresponding to a largest value in the N pieces of data channel quality information is the target network device.

In this implementation, a specific implementation of determining the target network device by the source network device when the data channel quality information is any one of the RSRP value of the CSI-RS, the RSRQ value of the CSI-RS, and the SINR value of the CSI-RS is proposed. In this case, the source network device determines, based on a value of the data channel quality information, a value of coverage quality of the data channel between the candidate network device and the terminal device. Therefore, in this implementation, the source network device may sift a network device meeting the service requirement of the terminal device as the target network device, to enhance reliability of the solution.

According to any one of the first aspect, or the first implementation of the first aspect to the fifth implementation of the first aspect, in a sixth implementation of the first aspect of this embodiment of this application, before the source network device receives the N pieces of data quality channel information, the method further includes: The source network device sends a first measurement parameter to the terminal device, where the first measurement parameter is used to indicate the terminal device to measure the first reference signals of the candidate network devices, and the first measurement parameter includes resource position information of the first reference signal of each of the N candidate network devices and a condition for reporting the data channel quality information.

In this implementation, it is proposed that before receiving the data channel quality information sent by the terminal device, the source network device sends the first measurement parameter to the terminal device, to indicate the resource position information of the first reference signal that is of the candidate network device and that needs to be measured by the terminal device and the condition for reporting the data channel quality information. Therefore, the data channel quality information measured by the terminal device can be more accurate.

According to the first aspect or the first implementation of the first aspect, in a seventh implementation of the first aspect of this embodiment of this application, that a source network device receives N pieces of data channel quality information includes: The source network device receives, from each of the N candidate network devices, the data channel quality information corresponding to the candidate network device.

In this implementation, a source of the data channel quality information received by the source network device is determined. Because the source network device receives the data channel quality information from the candidate network device, it may be inferred that the data channel quality information is obtained by the candidate network device by measuring a reference signal of the terminal device.

According to the seventh implementation of the first aspect, in an eighth implementation of the first aspect of this embodiment of this application, each of the N pieces of data channel quality information is obtained by a corresponding candidate network device by measuring the reference signal of the terminal device.

In this implementation, it is determined that the reference signal measured by the candidate network device is the reference signal of the terminal device. Therefore, a method for obtaining the data channel quality information by the candidate network device is determined.

According to the eighth implementation of the first aspect, in a ninth implementation of the first aspect of this embodiment of this application, the reference signal of the terminal device is a sounding reference signal SRS, and each of the N pieces of data channel quality information includes at least one of a reference signal received power RSRP value of the SRS or a signal interference plus noise ratio SINR value of the SRS.

In this implementation, a specific implementation of the reference signal of the terminal device and a specific implementation of the data channel quality information are proposed. The reference signal of the terminal device is the SRS, and a measurement result of the SRS signal of the terminal device by the candidate network device is at least one of the reference signal received power RSRP value of the SRS and the signal to interference plus noise ratio SINR value of the SRS. Because the measurement result of the SRS signal of the terminal device has diversity, a sifting result of determining the target network device by the source network device also varies.

According to the ninth implementation of the first aspect, in a tenth implementation of the first aspect of this embodiment of this application, each of the N pieces of data channel quality information is either of the RSRP value of the SRS and the SINR value of the SRS; and that the source network device determines one of the N candidate network devices as the target network device based on the N pieces of data channel quality information includes: The source network device determines that one network device in at least one candidate network device corresponding to a largest value in the N pieces of data channel quality information is the target network device.

In this implementation, a specific implementation of determining the target network device by the source network device when the data channel quality information is either of the RSRP value of the SRS and the SINR value of the SRS is proposed. In this case, the source network device determines, based on a value of the data channel quality information, a value of coverage quality of the data channel between the candidate network device and the terminal device. Therefore, in this implementation, the source network device may sift a network device meeting the service requirement of the terminal device as the target network device, to enhance reliability of the solution.

According to any one of the seventh implementation of the first aspect to the tenth implementation of the first aspect, in an eleventh implementation of the first aspect of this embodiment of this application, before the source network device receives the N pieces of data channel quality information, the method further includes: The source network device sends a second measurement parameter to each of the N candidate network devices, where the second measurement parameter is used to indicate the candidate network device to measure the reference signal of the terminal device, and the second measurement parameter includes resource position information of the reference signal of the terminal device.

In this implementation, it is proposed that before receiving the data channel quality information sent by the candidate network device, the source network device sends the second measurement parameter to the candidate network device, to indicate the resource position information of the reference signal that is of the terminal device and that needs to be measured by the candidate network device. Therefore, the data channel quality information measured by the terminal device can be more accurate.

According to the eleventh implementation of the first aspect, in a twelfth implementation of the first aspect of this embodiment of this application, the second measurement parameter further includes a condition for reporting the data channel quality information.

In this implementation, it is proposed that the second measurement parameter may indicate not only the resource position information of the reference signal that is of the terminal device and that needs to be measured by the candidate network device, but also the condition for reporting the data channel quality information. Therefore, it can be further ensured that the data channel quality information measured by the terminal device is more accurate.

According to the sixth implementation of the first aspect or the eleventh implementation of the first aspect, in a thirteenth implementation of the first aspect of this embodiment of this application, before the source network device sends the first measurement parameter to the terminal device or the source network device sends the second measurement parameter to each of the N candidate network devices, the method further includes: The source network device receives M pieces of broadcast channel quality information from the terminal device, where the M pieces of broadcast channel quality information are in a one-to-one correspondence with M candidate network devices, each of the M pieces of broadcast channel quality information is used to indicate coverage quality of a broadcast channel between the terminal device and a candidate network device corresponding to the broadcast channel quality information, M is greater than or equal to N, and M is an integer greater than or equal to 2. The source network device determines the N candidate network devices in the M candidate network devices based on the M pieces of broadcast channel quality information.

In this implementation, it is proposed that when determining the candidate network devices, the source network device needs to refer to the broadcast channel quality information of the candidate network devices that is measured by the terminal device. Then, the source network device may sift the N candidate network devices from the M candidate network devices, where M is greater than N, and both M and N are integers greater than or equal to 1. It can be learned that, the source network device may sift, by analyzing the broadcast channel quality information of the candidate network devices, at least one candidate network device meeting a broadcast channel coverage quality requirement of the terminal device, and further measure the at least one candidate network device. In this way, a range of candidate network devices can be narrowed down. In addition, power consumption consumed by measuring the broadcast channel quality information is usually smaller than power consumption consumed by measuring the data channel quality information. Therefore, measurement resources can be properly saved.

According to the thirteenth implementation of the first aspect, in a fourteenth implementation of the first aspect of this embodiment of this application, that the source network device determines the N candidate network devices in the M candidate network devices based on the M pieces of broadcast channel quality information includes: The source network device sorts the M pieces of broadcast channel quality information in descending order of coverage quality of the broadcast channels, and determines that N candidate network devices corresponding to first N pieces of broadcast channel quality information are the N candidate network devices.

In this implementation, a specific implementation of determining the N candidate network devices in the M candidate network devices based on the broadcast channel quality information, that is, selecting candidate network devices with top N pieces of broadcast channel quality information, is proposed.

According to any one of the foregoing implementations, in a fifteenth implementation of the first aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in a sixteenth implementation of the first aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in a seventeenth implementation of the first aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a second aspect, an embodiment of this application provides a switching method, including: When a terminal device has a switching requirement, to sift a target network device meeting a communication requirement of the terminal device for the terminal device, a source network device may indicate the terminal device to measure a reference signal of a candidate network device. Therefore, terminal device may send N pieces of data channel quality information to the source network device, where the N pieces of data channel quality information are in a one-to-one correspondence with N candidate network devices, and each of the N pieces of data channel quality information is used to indicate coverage quality of a data channel between the terminal device and a candidate network device corresponding to the data channel quality information, so that the source network device determines one of the N candidate network devices as a target network device based on the N pieces of data channel quality information, where the target network device is a network device to which the terminal device is to be switched from the source network device. In this embodiment, because there are usually a plurality of candidate network devices near the source network device, N is an integer greater than or equal to 1.

In this embodiment of this application, the terminal device may send the N pieces of data channel quality information to the source network device, so that the source network device determines the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet the communication requirement of the terminal device, so that the service rate of the terminal device can be improved.

According to the second aspect, in a first implementation of the second aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the second aspect or the first implementation of the second aspect, in a second implementation of the second aspect of this embodiment of this application, each of the N pieces of data channel quality information is obtained by the terminal device by measuring a first reference signal of a candidate network device corresponding to the data channel quality information.

In this implementation, it is determined that the reference signal measured by the terminal device is the first reference signal of the candidate network device. Therefore, a method for obtaining the data channel quality information by the terminal device is determined.

According to the second implementation of the second aspect, in a third implementation of the second aspect of this embodiment of this application, the first reference signal of the candidate network device is a channel state information reference signal CSI-RS, and each of the N pieces of data channel quality information includes at least one of a reference signal received power RSRP value of the CSI-RS, a reference signal received quality RSRQ value of the CSI-RS, and a signal to interference plus noise ratio SINR value of the CSI-RS.

In this implementation, a specific implementation of the first reference signal and a specific implementation of the data channel quality information are proposed. The first reference signal is the CSI-RS, and a measurement result of the CSI-RS signal of the candidate network device by the terminal device is at least one of the reference signal received power RSRP value of the CSI-RS, the reference signal received quality RSRQ value of the CSI-RS, and the signal to interference plus noise ratio SINR value of the CSI-RS. Because the measurement result of the CSI-RS signal of the candidate network device has diversity, a sifting result of determining the target network device by the source network device also varies.

According to the second aspect or the first implementation of the second aspect to the third implementation of the second aspect, in a fourth implementation of the second aspect of this embodiment of this application, before the terminal device sends the N pieces of data channel quality information to the source network device, the method further includes: The terminal device receives a first measurement parameter sent by the source network device, where the first measurement parameter includes resource position information of the first reference signal of each of the N candidate network devices and a condition for reporting the data channel quality information. The terminal device measures the first reference signal of each of the N candidate network devices based on the first measurement parameter, to obtain the N pieces of data channel quality information.

In this implementation, it is proposed that before sending the N pieces of data channel quality information to the source network device, the terminal device receives the first measurement parameter sent by the source network device, to indicate the resource position information of the first reference signal that is of the candidate network device and that needs to be measured by the terminal device and the condition for reporting the data channel quality information. Therefore, the data channel quality information measured by the terminal device can be more accurate.

According to the fourth implementation of the second aspect, in a fifth implementation of the second aspect of this embodiment of this application, before the terminal device receives the first measurement parameter sent by the source network device, the method further includes: The terminal device measures a second reference signal of each of M candidate network devices based on a third measurement parameter sent by the source network device, to obtain M pieces of broadcast channel quality information, where the M pieces of broadcast channel quality information are in a one-to-one correspondence with the M candidate network devices, each of the M pieces of broadcast channel quality information is used to indicate coverage quality of a broadcast channel between the terminal device and a candidate network device corresponding to the broadcast channel quality information, M is greater than or equal to N, and M is an integer greater than or equal to 2. The terminal device sends the M pieces of broadcast channel quality information to the source network device, so that the source network device determines the N candidate network devices in the M candidate network devices based on the M pieces of broadcast channel quality information.

In this implementation, the terminal device may measure each candidate network device based on an indication of the source network device, to obtain the M pieces of broadcast channel quality information, so that the source network device sifts the N candidate network devices from the M candidate network devices based on the M pieces of broadcast channel quality information, where M is greater than N, and both M and N are integers greater than or equal to 1.

It can be learned that, the source network device may sift, by analyzing the broadcast channel quality information of the candidate network devices, at least one candidate network device meeting a broadcast channel coverage quality requirement of the terminal device, and further measure the at least one candidate network device. In this way, a range of candidate network devices can be narrowed down. In addition, power consumption consumed by measuring the broadcast channel quality information is usually smaller than power consumption consumed by measuring the data channel quality information. Therefore, measurement resources can be properly saved.

According to any one of the foregoing implementations, in the fifteenth implementation of the first aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in the sixteenth implementation of the first aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in the seventeenth implementation of the first aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a third aspect, an embodiment of this application provides a switching method, including: A candidate network device sends data channel quality information to a source network device, where the data channel quality information is used to indicate coverage quality of a data channel between the candidate network device and a terminal device, so that the source network device determines one of N candidate network devices as a target network device based on N pieces of data channel quality information, where the target network device is a network device to which the terminal device is to be switched from the source network device, the N pieces of data channel quality information are in a one-to-one correspondence with the N candidate network devices, and N is an integer greater than or equal to 1.

In this embodiment of this application, the candidate network devices may send the N pieces of data channel quality information to the source network device, so that the source network device determines the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet a communication requirement of the terminal device, so that the service rate of the terminal device can be improved.

According to the third aspect, in a first implementation of the third aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the third aspect or the first implementation of the third aspect, in a second implementation of the third aspect of this embodiment of this application, each of the N pieces of data channel quality information is obtained by a corresponding candidate network device by measuring a reference signal of the terminal device.

In this implementation, it is determined that the reference signal measured by the candidate network device is the reference signal of the terminal device. Therefore, a method for obtaining the data channel quality information by the candidate network device is determined.

According to the second implementation of the third aspect, in a third implementation of the third aspect of this embodiment of this application, the reference signal of the terminal device is a sounding reference signal SRS, and each of the N pieces of data channel quality information includes at least one of a reference signal received power RSRP value of the SRS or a signal interference plus noise ratio SINR value of the SRS.

In this implementation, a specific implementation of the reference signal of the terminal device and a specific implementation of the data channel quality information are proposed. The reference signal of the terminal device is the SRS, and a measurement result of the SRS signal of the terminal device by the candidate network device is at least one of the reference signal received power RSRP value of the SRS and the signal to interference plus noise ratio SINR value of the SRS. Because the measurement result of the SRS signal of the terminal device has diversity, a sifting result of determining the target network device by the source network device also varies.

According to the third aspect or the first implementation of the third aspect to the third implementation of the third aspect, in a fourth implementation of the third aspect of this embodiment of this application, before the candidate network device sends the data channel quality information to the source network device, the method further includes: The candidate network device receives a second measurement parameter sent by the source network device, where the second measurement parameter includes resource position information of the reference signal of the terminal device. The candidate network device measures the reference signal of the terminal device based on the second measurement parameter, to obtain the data channel quality information.

In this implementation, it is proposed that before sending the data channel quality information to the source network device, the candidate network device receives the second measurement parameter sent by the source network device, to indicate the resource position information of the reference signal that is of the terminal device and that needs to be measured by the candidate network device. Therefore, the data channel quality information measured by the terminal device can be more accurate.

According to the fourth implementation of the third aspect, in a fifth implementation of the third aspect of this embodiment of this application, the second measurement parameter further includes a condition for reporting the data channel quality information.

In this implementation, it is proposed that the second measurement parameter may indicate not only the resource position information of the reference signal that is of the terminal device and that needs to be measured by the candidate network device, but also the condition for reporting the data channel quality information. Therefore, it can be further ensured that the data channel quality information measured by the terminal device is more accurate.

According to any one of the foregoing implementations, in the fifteenth implementation of the first aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in the sixteenth implementation of the first aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in the seventeenth implementation of the first aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a fourth aspect, an embodiment of this application provides a network device, including: a communication module, configured to receive N pieces of data channel quality information, where the N pieces of data channel quality information are in a one-to-one correspondence with N candidate network devices, and each of the N pieces of data channel quality information is used to indicate coverage quality of a data channel between a terminal device and a candidate network device corresponding to the data channel quality information; and a processing module, configured to sift, based on the N pieces of data channel quality information and according to a specific rule, one candidate network device from the N candidate network devices as a target network device, so that a communication requirement of the terminal device can be met after the terminal device is switched to the target network device.

In this embodiment, the communication module may be a network interface between a source network device and a candidate network device, or may be a transceiver and an antenna in the source network device. This is not specifically limited herein.

In this embodiment, because there are usually a plurality of candidate network devices near the source network device, N is an integer greater than or equal to 1.

In this embodiment of this application, the source network device may determine the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet the communication requirement of the terminal device, so that the service rate of the terminal device can be improved.

According to the fourth aspect, in a first implementation of the fourth aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the fourth aspect or the first implementation of the fourth aspect, in a second implementation of the fourth aspect of this embodiment of this application, the communication module is specifically configured to receive the N pieces of data channel quality information from the terminal device.

In this implementation, the communication module is the transceiver and the antenna in the source network device.

In this implementation, a source of the data channel quality information received by the source network device is determined. Because the source network device receives the data channel quality information from the terminal device, it may be inferred that the data channel quality information is obtained by the terminal device by measuring a reference signal of the candidate network device.

According to the second implementation of the fourth aspect, in a third implementation of the fourth aspect of this embodiment of this application, each of the N pieces of data channel quality information is obtained by the terminal device by measuring a first reference signal of a candidate network device corresponding to the data channel quality information.

In this implementation, it is determined that the reference signal measured by the terminal device is the first reference signal of the candidate network device. Therefore, a method for obtaining the data channel quality information by the terminal device is determined.

According to the third implementation of the fourth aspect, in a fourth implementation of the fourth aspect of this embodiment of this application, the first reference signal is a channel state information reference signal CSI-RS, and each of the N pieces of data channel quality information includes at least one of a reference signal received power RSRP value of the CSI-RS, a reference signal received quality RSRQ value of the CSI-RS, and a signal to interference plus noise ratio SINR value of the CSI-RS.

In this implementation, a specific implementation of the first reference signal and a specific implementation of the data channel quality information are proposed. The first reference signal is the CSI-RS, and a measurement result of the CSI-RS signal of the candidate network device by the terminal device is at least one of the reference signal received power RSRP value of the CSI-RS, the reference signal received quality RSRQ value of the CSI-RS, and the signal to interference plus noise ratio SINR value of the CSI-RS. Because the measurement result of the CSI-RS signal of the candidate network device has diversity, a sifting result of determining the target network device by the source network device also varies.

According to the fourth implementation of the fourth aspect, in a fifth implementation of the fourth aspect of this embodiment of this application, each of the N pieces of data channel quality information is any one of the RSRP value of the CSI-RS, the RSRQ value of the CSI-RS, and the SINR value of the CSI-RS. The processing module is specifically configured to determine that one network device in at least one candidate network device corresponding to a largest value in the N pieces of data channel quality information is the target network device.

In this implementation, a specific implementation of determining the target network device by the source network device when the data channel quality information is any one of the RSRP value of the CSI-RS, the RSRQ value of the CSI-RS, and the SINR value of the CSI-RS is proposed. In this case, the source network device determines, based on a value of the data channel quality information, a value of coverage quality of the data channel between the candidate network device and the terminal device. Therefore, in this implementation, the source network device may sift a network device meeting the service requirement of the terminal device as the target network device, to enhance reliability of the solution.

According to any one of the fourth aspect, or the first implementation of the fourth aspect to the fifth implementation of the fourth aspect, in a sixth implementation of the fourth aspect of this embodiment of this application, the communication module is further configured to send a first measurement parameter to the terminal device, where the first measurement parameter is used to indicate the terminal device to measure the first reference signal of the candidate network device, and the first measurement parameter includes resource position information of the first reference signal of each of the N candidate network devices and a condition for reporting the data channel quality information.

In this implementation, the communication module is the transceiver and the antenna in the source network device.

In this implementation, it is proposed that before receiving the data channel quality information sent by the terminal device, the source network device sends the first measurement parameter to the terminal device, to indicate the resource position information of the first reference signal that is of the candidate network device and that needs to be measured by the terminal device and the condition for reporting the data channel quality information. Therefore, the data channel quality information measured by the terminal device can be more accurate.

According to the fourth aspect or the first implementation of the fourth aspect, in a seventh implementation of the fourth aspect of this embodiment of this application, the communication module is specifically configured to receive, from each of the N candidate network devices, the data channel quality information corresponding to the candidate network device.

In this embodiment, the communication module is the network interface between the source network device and the candidate network device.

In this implementation, a source of the data channel quality information received by the source network device is determined. Because the source network device receives the data channel quality information from the candidate network device, it may be inferred that the data channel quality information is obtained by the candidate network device by measuring a reference signal of the terminal device.

According to the seventh implementation of the fourth aspect, in an eighth implementation of the fourth aspect of this embodiment of this application, each of the N pieces of data channel quality information is obtained by a corresponding candidate network device by measuring the reference signal of the terminal device.

In this implementation, it is determined that the reference signal measured by the candidate network device is the reference signal of the terminal device. Therefore, a method for obtaining the data channel quality information by the candidate network device is determined.

According to the eighth implementation of the fourth aspect, in a ninth implementation of the fourth aspect of this embodiment of this application, the reference signal of the terminal device is a sounding reference signal SRS, and each of the N pieces of data channel quality information includes at least one of a reference signal received power RSRP value of the SRS or a signal interference plus noise ratio SINR value of the SRS.

In this implementation, a specific implementation of the reference signal of the terminal device and a specific implementation of the data channel quality information are proposed. The reference signal of the terminal device is the SRS, and a measurement result of the SRS signal of the terminal device by the candidate network device is at least one of the reference signal received power RSRP value of the SRS and the signal to interference plus noise ratio SINR value of the SRS. Because the measurement result of the SRS signal of the terminal device has diversity, a sifting result of determining the target network device by the source network device also varies.

According to the ninth implementation of the fourth aspect, in a tenth implementation of the fourth aspect of this embodiment of this application, each of the N pieces of data channel quality information is either of the RSRP value of the SRS and the SINR value of the SRS. The processing module is specifically configured to determine that one network device in at least one candidate network device corresponding to a largest value in the N pieces of data channel quality information is the target network device.

In this implementation, a specific implementation of determining the target network device by the source network device when the data channel quality information is either of the RSRP value of the SRS and the SINR value of the SRS is proposed. In this case, the source network device determines, based on a value of the data channel quality information, a value of coverage quality of the data channel between the candidate network device and the terminal device. Therefore, in this implementation, the source network device may sift a network device meeting the service requirement of the terminal device as the target network device, to enhance reliability of the solution.

According to any one of the seventh implementation of the fourth aspect to the tenth implementation of the fourth aspect, in an eleventh implementation of the fourth aspect of this embodiment of this application, the processing module is further configured to send a second measurement parameter to each of the N candidate network devices, where the second measurement parameter is used to indicate the candidate network device to measure the reference signal of the terminal device, and the second measurement parameter includes resource position information of the reference signal of the terminal device.

In this implementation, it is proposed that before receiving the data channel quality information sent by the candidate network device, the source network device sends the second measurement parameter to the candidate network device, to indicate the resource position information of the reference signal that is of the terminal device and that needs to be measured by the candidate network device. Therefore, the data channel quality information measured by the terminal device can be more accurate.

According to the eleventh implementation of the fourth aspect, in a twelfth implementation of the fourth aspect of this embodiment of this application, the second measurement parameter further includes a condition for reporting the data channel quality information.

In this implementation, it is proposed that the second measurement parameter may indicate not only the resource position information of the reference signal that is of the terminal device and that needs to be measured by the candidate network device, but also the condition for reporting the data channel quality information. Therefore, it can be further ensured that the data channel quality information measured by the terminal device is more accurate.

According to the sixth implementation of the fourth aspect or the eleventh implementation of the fourth aspect, in a thirteenth implementation of the fourth aspect of this embodiment of this application, the communication module is further configured to receive M pieces of broadcast channel quality information from the terminal device, where the M pieces of broadcast channel quality information are in a one-to-one correspondence with M candidate network devices, each of the M pieces of broadcast channel quality information is used to indicate coverage quality of a broadcast channel between the terminal device and a candidate network device corresponding to the broadcast channel quality information, M is greater than or equal to N, and M is an integer greater than or equal to 2. The processing module is further configured to determine the N candidate network devices in the M candidate network devices based on the M pieces of broadcast channel quality information.

In this implementation, the communication module is the transceiver and the antenna in the source network device.

In this implementation, it is proposed that when determining the candidate network devices, the source network device needs to refer to the broadcast channel quality information of the candidate network devices that is measured by the terminal device. Then, the source network device may sift the N candidate network devices from the M candidate network devices, where M is greater than N, and both M and N are integers greater than or equal to 1. It can be learned that, the source network device may sift, by analyzing the broadcast channel quality information of the candidate network devices, at least one candidate network device meeting a broadcast channel coverage quality requirement of the terminal device, and further measure the at least one candidate network device. In this way, a range of candidate network devices can be narrowed down. In addition, power consumption consumed by measuring the broadcast channel quality information is usually smaller than power consumption consumed by measuring the data channel quality information. Therefore, measurement resources can be properly saved.

According to the thirteenth implementation of the fourth aspect, in a fourteenth implementation of the fourth aspect of this embodiment of this application, the processing module is specifically configured to: sort the M pieces of broadcast channel quality information in descending order of coverage quality of the broadcast channels, and determine that N candidate network devices corresponding to the first N pieces of broadcast channel quality information are the N candidate network devices.

In this implementation, a specific implementation of determining the N candidate network devices in the M candidate network devices based on the broadcast channel quality information, that is, selecting candidate network devices with top N pieces of broadcast channel quality information, is proposed.

According to any one of the foregoing implementations, in a fifteenth implementation of the fourth aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in a sixteenth implementation of the fourth aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in a seventeenth implementation of the fourth aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a fifth aspect, an embodiment of this application provides a terminal device, including: a communication module, configured to send N pieces of data channel quality information to a source network device, where the N pieces of data channel quality information are in a one-to-one correspondence with N candidate network devices, and each of the N pieces of data channel quality information is used to indicate coverage quality of a data channel between the terminal device and a candidate network device corresponding to the data channel quality information, so that the source network device determines one of the N candidate network devices as a target network device based on the N pieces of data channel quality information, where the target network device is a network device to which the terminal device is to be switched from the source network device. In this embodiment, because there are usually a plurality of candidate network devices near the source network device, N is an integer greater than or equal to 1.

In this implementation, the communication module is a transceiver and an antenna in the terminal device.

In this embodiment of this application, the terminal device may send the N pieces of data channel quality information to the source network device, so that the source network device determines the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet a communication requirement of the terminal device, so that the service rate of the terminal device can be improved.

According to the fifth aspect, in a first implementation of the fifth aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the fifth aspect or the first implementation of the fifth aspect, in a second implementation of the fifth aspect of this embodiment of this application, each of the N pieces of data channel quality information is obtained by the terminal device by measuring a first reference signal of a candidate network device corresponding to the data channel quality information.

In this implementation, it is determined that a reference signal measured by the terminal device is the first reference signal of the candidate network device. Therefore, a method for obtaining the data channel quality information by the terminal device is determined.

According to the second implementation of the fifth aspect, in a third implementation of the fifth aspect of this embodiment of this application, the first reference signal of the candidate network device is a channel state information reference signal CSI-RS, and each of the N pieces of data channel quality information includes at least one of a reference signal received power RSRP value of the CSI-RS, a reference signal received quality RSRQ value of the CSI-RS, and a signal to interference plus noise ratio SINR value of the CSI-RS.

In this implementation, a specific implementation of the first reference signal and a specific implementation of the data channel quality information are proposed. The first reference signal is the CSI-RS, and a measurement result of the CSI-RS signal of the candidate network device by the terminal device is at least one of the reference signal received power RSRP value of the CSI-RS, the reference signal received quality RSRQ value of the CSI-RS, and the signal to interference plus noise ratio SINR value of the CSI-RS. Because the measurement result of the CSI-RS signal of the candidate network device has diversity, a sifting result of determining the target network device by the source network device also varies.

According to the fifth aspect or the first implementation of the fifth aspect to the third implementation of the fifth aspect, in a fourth implementation of the fifth aspect of this embodiment of this application, the communication module is further configured to receive a first measurement parameter sent by the source network device, where the first measurement parameter includes resource position information of the first reference signal of each of the N candidate network devices and a condition for reporting the data channel quality information. The terminal device further includes a processing module. The processing module is further configured to measure the first reference signal of each of the N candidate network devices based on the first measurement parameter, to obtain the N pieces of data channel quality information.

In this implementation, the communication module is the transceiver and the antenna in the terminal device.

In this implementation, it is proposed that before sending the N pieces of data channel quality information to the source network device, the terminal device receives the first measurement parameter sent by the source network device, to indicate the resource position information of the first reference signal that is of the candidate network device and that needs to be measured by the terminal device and the condition for reporting the data channel quality information. Therefore, the data channel quality information measured by the terminal device can be more accurate.

According to the fourth implementation of the fifth aspect, in a fifth implementation of the fifth aspect of this embodiment of this application, the processing module is further configured to measure a second reference signal of each of M candidate network devices based on a third measurement parameter sent by the source network device, to obtain M pieces of broadcast channel quality information, where the M pieces of broadcast channel quality information are in a one-to-one correspondence with the M candidate network devices, each of the M pieces of broadcast channel quality information is used to indicate coverage quality of a broadcast channel between the terminal device and a candidate network device corresponding to the broadcast channel quality information, M is greater than or equal to N, and M is an integer greater than or equal to 2. The communication module is further configured to send the M pieces of broadcast channel quality information to the source network device, so that the source network device determines the N candidate network devices in the M candidate network devices based on the M pieces of broadcast channel quality information.

In this implementation, the communication module is the transceiver and the antenna in the terminal device.

In this implementation, the terminal device may measure each candidate network device based on an indication of the source network device, to obtain the M pieces of broadcast channel quality information, so that the source network device sifts the N candidate network devices from the M candidate network devices based on the M pieces of broadcast channel quality information, where M is greater than N, and both M and N are integers greater than or equal to 1.

It can be learned that, the source network device may sift, by analyzing the broadcast channel quality information of the candidate network devices, at least one candidate network device meeting a broadcast channel coverage quality requirement of the terminal device, and further measure the at least one candidate network device. In this way, a range of candidate network devices can be narrowed down. In addition, power consumption consumed by measuring the broadcast channel quality information is usually smaller than power consumption consumed by measuring the data channel quality information. Therefore, measurement resources can be properly saved.

According to any one of the foregoing implementations, in the fifteenth implementation of the first aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in the sixteenth implementation of the first aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in the seventeenth implementation of the first aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a sixth aspect, an embodiment of this application provides a network device, including: a communication module, configured to send data channel quality information to a source network device, where the data channel quality information is used to indicate coverage quality of a data channel between the candidate network device and a terminal device, so that the source network device determines one of N candidate network devices as a target network device based on N pieces of data channel quality information, where the target network device is a network device to which the terminal device is to be switched from the source network device, the N pieces of data channel quality information are in a one-to-one correspondence with the N candidate network devices, and N is an integer greater than or equal to 1.

In this embodiment, the communication module is a network interface between the source network device and the candidate network device.

In this embodiment of this application, the candidate network device may send the N pieces of data channel quality information to the source network device, so that the source network device determines the target network device in the N candidate network devices based on the N pieces of data channel quality information. The data channel quality information may indicate the coverage quality of the data channel between the candidate network device and the terminal device.

In addition, the service rate of the terminal device depends more on the coverage quality of the data channel than coverage quality of a broadcast channel. Therefore, the target network device determined by the source network device can meet a communication requirement of the terminal device, so that the service rate of the terminal device can be improved.

According to the sixth aspect, in a first implementation of the sixth aspect of this embodiment of this application, the target network device is a candidate network device in the N candidate network devices, where the data channel between the candidate network device and the terminal device has optimal quality.

In this implementation, a rule for determining the target network device by the source network device based on the data channel quality information is determined. The source network device selects, from the N pieces of data channel quality information, a network device that indicates optimal coverage quality of the data channel between the terminal device and the candidate network device as the target network device. Because the service rate of the terminal device is positively related to the coverage quality of the data channel, the network device with the data channel having optimal quality can meet the service requirement of the terminal device.

According to the sixth aspect or the first implementation of the sixth aspect, in a second implementation of the sixth aspect of this embodiment of this application, each of the N pieces of data channel quality information is obtained by a corresponding candidate network device by measuring a reference signal of the terminal device.

In this implementation, it is determined that the reference signal measured by the candidate network device is the reference signal of the terminal device. Therefore, a method for obtaining the data channel quality information by the candidate network device is determined.

According to the second implementation of the sixth aspect, in a third implementation of the sixth aspect of this embodiment of this application, the reference signal of the terminal device is a sounding reference signal SRS, and each of the N pieces of data channel quality information includes at least one of a reference signal received power RSRP value of the SRS or a signal interference plus noise ratio SINR value of the SRS.

In this implementation, a specific implementation of the reference signal of the terminal device and a specific implementation of the data channel quality information are proposed. The reference signal of the terminal device is the SRS, and a measurement result of the SRS signal of the terminal device by the candidate network device is at least one of the reference signal received power RSRP value of the SRS and the signal to interference plus noise ratio SINR value of the SRS. Because the measurement result of the SRS signal of the terminal device has diversity, a sifting result of determining the target network device by the source network device also varies.

According to the sixth aspect or the first implementation of the sixth aspect to the third implementation of the sixth aspect, in a fourth implementation of the sixth aspect of this embodiment of this application, the communication module is further configured to receive a second measurement parameter sent by the source network device, where the second measurement parameter includes resource position information of the reference signal of the terminal device. The network device further includes a processing module. The processing module is configured to measure the reference signal of the terminal device based on the second measurement parameter, to obtain the data channel quality information.

In this embodiment, the communication module is the network interface between the source network device and the candidate network device.

In this implementation, the candidate network device receives the second measurement parameter sent by the source network device, to indicate the resource position information of the reference signal that is of the terminal device and that needs to be measured by the candidate network device. Therefore, the data channel quality information measured by the terminal device can be more accurate.

According to the fourth implementation of the sixth aspect, in a fifth implementation of the sixth aspect of this embodiment of this application, the second measurement parameter further includes a condition for reporting the data channel quality information.

In this implementation, it is proposed that the second measurement parameter may indicate not only the resource position information of the reference signal that is of the terminal device and that needs to be measured by the candidate network device, but also the condition for reporting the data channel quality information. Therefore, it can be further ensured that the data channel quality information measured by the terminal device is more accurate.

According to any one of the foregoing implementations, in the fifteenth implementation of the first aspect of this embodiment of this application, the N candidate network devices are network devices to which a neighboring cell of a cell of the source network device belongs.

In this implementation, another implementation of determining the N candidate network devices is proposed. The source network device may directly sift the N candidate network devices from a neighboring relation table. Alternatively, the source network device determines that network devices with top N pieces of broadcast channel quality in the neighboring relation table are the N candidate network devices. Therefore, a manner of determining the candidate network device may have diversity, so that the manner is further applicable to different application scenarios.

According to any one of the foregoing implementations, in the sixteenth implementation of the first aspect of this embodiment of this application, each of the M pieces of broadcast channel quality information is obtained by the terminal device by measuring a second reference signal of a candidate network device corresponding to the broadcast channel quality information.

In this implementation, a source of the broadcast channel quality information is determined. That is, the broadcast channel quality information is obtained by the terminal device by measuring the second reference signal of the candidate network device.

According to any one of the foregoing implementations, in the seventeenth implementation of the first aspect of this embodiment of this application, the second reference signal of the candidate network device is a synchronization signal block SSB, and each of the M pieces of broadcast channel quality information includes any one of a reference signal received power RSRP value of the SSB, a reference signal received quality RSRQ value of the SSB, and a signal to interference plus noise ratio SINR value of the SSB.

In this implementation, a specific implementation of the second reference signal of the candidate network device and a specific implementation of the data channel quality information are proposed. The second reference signal of the candidate network device is the SSB, and a measurement result of the SSB signal of the candidate network device by the terminal device is any of the reference signal received power RSRP value of the SSB, the reference signal received quality RSRQ value of the SSB, and the signal to interference plus noise ratio SINR value of the SSB. Because the measurement result of the SSB signal of the candidate network device has diversity, a sifting result of determining the N candidate network devices by the source network device also varies.

According to a seventh aspect, an embodiment of this application provides a communication device. The communication device may be a source network device or a chip in the source network device. The communication device may include a processor. The processor is configured to execute a computer program or instructions, so that the communication device is enabled to perform the method according to any one of the first aspect or the implementations of the first aspect.

Optionally, the communication device further includes a memory. The processor is coupled to the memory, the memory is configured to store the computer program or the instructions, and the processor is configured to execute the computer program or the instructions in the memory.

Optionally, the communication device may further include a communication unit. The communication unit is configured to communicate with another device or another component in the communication device. For example, when the communication device is the source network device, the communication unit is a transceiver. For example, when the communication device is the chip in the source network device, the communication unit is an input/output circuit or an interface of the chip.

According to an eighth aspect, an embodiment of this application provides a communication device. The communication device may be a terminal device or a chip in the terminal device. The communication device may include a processor. The processor is configured to execute a computer program or instructions, so that the communication device is enabled to perform the method according to any one of the second aspect or the implementations of the second aspect.

Optionally, the communication device further includes a memory. The processor is coupled to the memory, the memory is configured to store the computer program or the instructions, and the processor is configured to execute the computer program or the instructions in the memory.

Optionally, the communication device may further include a communication unit. The communication unit is configured to communicate with another device or another component in the communication device. For example, when the communication device is the terminal device, the communication unit is a transceiver. For example, when the communication device is the chip in the terminal device, the communication unit is an input/output circuit or an interface of the chip.

According to a ninth aspect, an embodiment of this application provides a communication device. The communication device may be a candidate network device or a chip in the candidate network device. The communication device may include a processor. The processor is configured to execute a computer program or instructions, so that the communication device is enabled to perform the method according to any one of the third aspect or the implementations of the third aspect.

Optionally, the communication device further includes a memory. The processor is coupled to the memory, the memory is configured to store the computer program or the instructions, and the processor is configured to execute the computer program or the instructions in the memory.

Optionally, the communication device may further include a communication unit. The communication unit is configured to communicate with another device or another component in the communication device. For example, when the communication device is the candidate network device, the communication unit is a transceiver. For example, when the communication device is the chip in the candidate network device, the communication unit is an input/output circuit or an interface of the chip.

According to a tenth aspect, an embodiment of this application provides a communication system, including: the source network device according to the fourth aspect or any implementation of the fourth aspect, the terminal device according to the fifth aspect or any implementation of the fifth aspect, and the candidate network device according to the sixth aspect or any implementation of the sixth aspect. Alternatively, the communication system includes: the communication device according to the seventh aspect, the communication device according to the eighth aspect, and the communication device according to the ninth aspect.

According to an eleventh aspect, an embodiment of this application provides a chip. The chip includes a processor and an interface circuit. The interface circuit is coupled to the processor. The processor is configured to run a computer program or instructions, to implement the method according to any one of the first aspect, the second aspect, or the third aspect. The interface circuit is configured to communicate with a module other than the chip.

According to a twelfth aspect, an embodiment of this application provides a computer program product including instructions. When the computer program product runs on a computer, the computer is enabled to perform the method according to any one of the first aspect and the implementations of the first aspect, the second aspect and the implementations of the second aspect, or the third aspect and the implementations of the third aspect.

According to a thirteenth aspect, an embodiment of this application provides a computer-readable storage medium, including instructions. When the instructions are run on a computer, the computer is enabled to perform the method according to any one of the first aspect and the implementations of the first aspect, the second aspect and the implementations of the second aspect, or the third aspect and the implementations of the third aspect.

It can be learned from the foregoing technical solutions that embodiments of this application have the following advantages:

In the embodiments of this application, the source network device may determine the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet the communication requirement of the terminal device, so that the service rate of the terminal device can be improved.

BRIEF DESCRIPTION OF DRAWINGS

To describe technical solutions in embodiments of this application more clearly, the following briefly describes the accompanying drawings for describing the embodiments. It is clear that the accompanying drawings in the following descriptions show merely some embodiments of this application.

FIG. 4A and FIG. 4B are another flowchart of a switching method according to an embodiment of this application;

FIG. 6A and FIG. 6B are another flowchart of a switching method according to an embodiment of this application;

DESCRIPTION OF EMBODIMENTS

Embodiments of this application provide a switching method and a related device. A target network device that can better meet a communication requirement of a terminal device is determined by using a source network device, so that a throughput and a service rate that are of radio resources of the terminal device can be improved after the terminal device is switched to the target network device.

In this specification, the claims, and the accompanying drawings of this application, terms "first", "second", "third", "fourth", and the like (if existent) are intended to distinguish between similar objects but do not necessarily indicate a specific order or sequence. It should be understood that data termed in such a way is interchangeable in proper circumstances, so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The following describes some terms in the embodiments of this application.

A broadcast channel (broadcast channel, BCH) is a channel used to carry system information necessary for a terminal device to initially access a network. Coverage quality of the broadcast channel is used to indicate coverage performance of the broadcast channel. When the coverage quality of the broadcast channel is poor, the terminal device cannot access the network or the terminal device that has accessed the network may be disconnected from the network. A reference signal reflecting the coverage quality of the broadcast channel usually includes a synchronization signal block SSB and the like.

A data channel is a channel used to carry common service data. Data services of the terminal device for network access are all carried on this channel. Coverage quality of the data channel is used to indicate coverage performance of the data channel. When the coverage quality of the data channel is poor, a data service of the terminal device is affected, and a network access rate of the terminal device decreases. A reference signal reflecting the coverage quality of the data channel includes a channel state information reference signal (channel state information-reference signal, CSI-RS) or a sounding reference signal (sounding reference signal, SRS).

The following describes a system architecture and an application scenario of the switching method proposed in the embodiments of this application.

Figure 1:
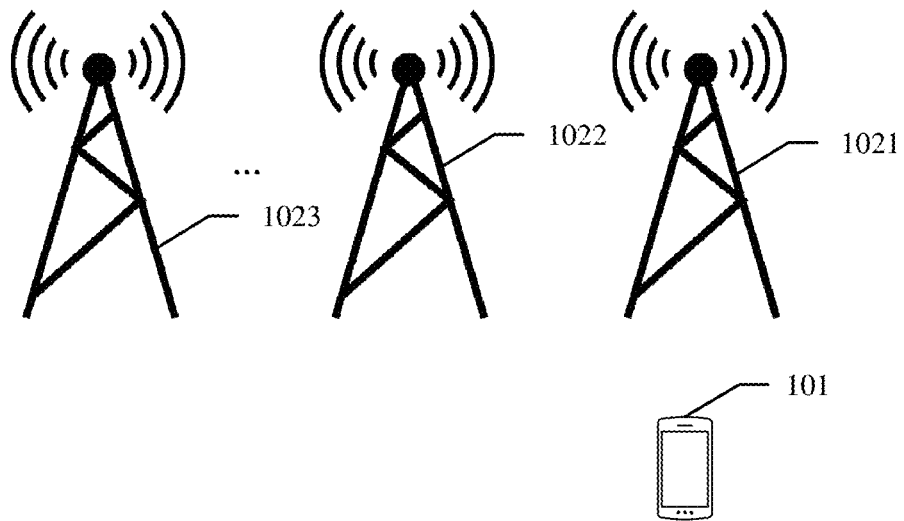
FIG. 1 is a schematic diagram of a network architecture of a switching method according to an embodiment of this application.

The solutions proposed in the embodiments of this application are mainly based on a 5th generation (the 5th generation, 5G) mobile communications technology or a new radio (new radio, NR) technology, or may be based on a subsequently evolved access standard. This is not specifically limited herein. In this embodiment and subsequent embodiments, only a 5G-based communication system is used as an example for description. As shown in FIG. 1, the communication system includes a terminal device 101 and a plurality of network devices 1021, 1022, and 1023. The terminal device 101 may be switched from one network device to another network device. Before the switching operation, a network device serving the terminal device 101 is a source network device 1021, and after the switching operation, a network device serving the terminal device 101 is a target network device 1022. In the plurality of network devices 1021, 1022, and 1023, network devices other than the source network device 1021 may be referred to as candidate network devices 1022 and 1023. The target network device 1022 is a network device determined in the candidate network devices 1022 and 1023.

It should be understood that the source network device 1021, the candidate network devices 1022 and 1023, and the target network device 1022 in this embodiment of this application may be radio access network (radio access network, RAN) devices. Specifically, the RAN device may be a base station or an access point, or may be a device that is in an access network and that communicates with the terminal device over an air interface through one or more cells. The RAN device may be configured to perform mutual conversion between a received over-the-air frame and a received internet protocol (internet protocol, IP) packet, and serve as a router between the terminal device and a remaining part of the access network. The RAN device may further coordinate attribute management of the air interface. For example, the RAN device may be a next generation NodeB (next generation node B, gNB) in a new radio NR system, or a centralized unit (centralized unit, CU) and a distributed unit (distributed unit, DU) in a cloud access network (Cloud RAN) system. This is not limited in the embodiments of this application. It should be understood that the source network device 1021, the candidate network devices, and the target network device may alternatively be devices having functions the same as or similar to functions of the RAN device. This is not specifically limited herein.

It should be further understood that the terminal device 101 includes a device that provides voice and/or data connectivity for a user. For example, the terminal device may include a handheld device having a wireless connection function, or a processing device connected to a wireless modem. The terminal device 101 may communicate with a core network over a RAN, and exchange a voice and/or data with the RAN. In a 5G-based vehicle to everything (vehicle to everything, V2X) system, the terminal device 101 may alternatively be a vehicle-mounted terminal. In addition, the terminal device 101 may alternatively be a wearable device, such as glasses, gloves, a watch, clothing, shoes, or another portable device that can be worn directly on the body or integrated into clothing or an accessory of the user. This is not specifically limited in this application. In this embodiment and the subsequent embodiments, only the terminal device is used as an example for description.

Based on the 5G communication system, the solutions proposed in the embodiments of this application may be applied to a scenario in which the source network device 1021 determines, for the terminal device 101, a network device that provides a service. Specifically, the source network device 1021 may sift a plurality of candidate network devices from the foregoing plurality of network devices by using the solutions proposed in the embodiments of this application, and sift a target network device from the plurality of candidate network devices.

Figure 2:
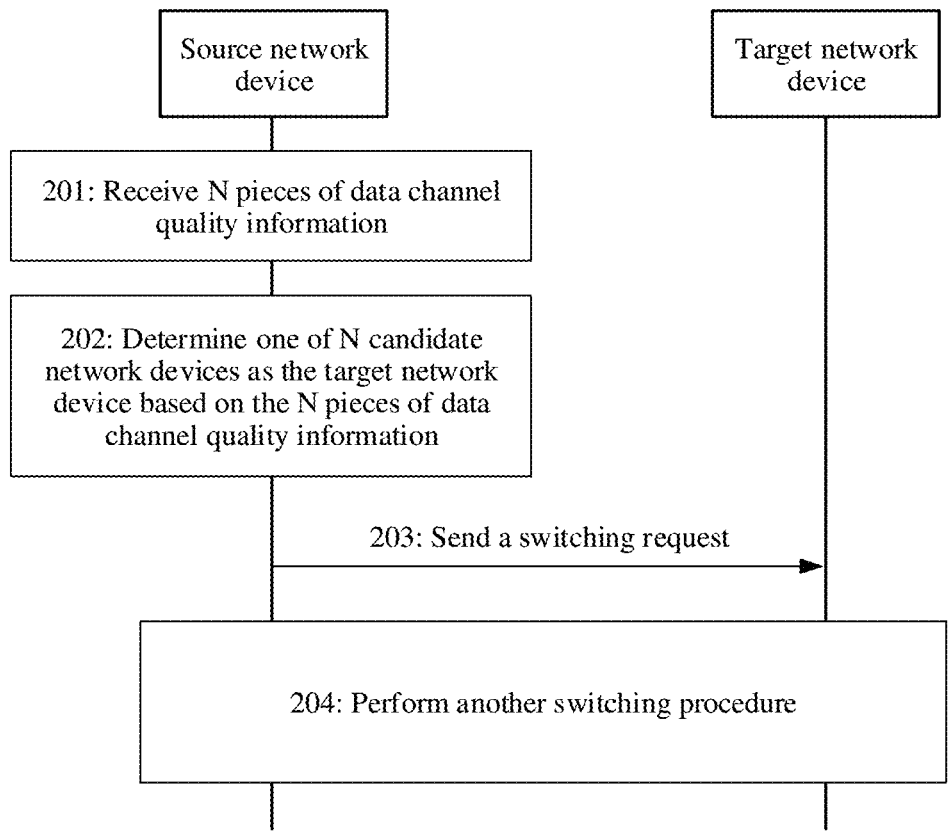
FIG. 2 is a flowchart of a switching method according to an embodiment of this application.

For ease of understanding, the following describes a main procedure of the switching method based on the system architecture shown in FIG. 1. Specifically, as shown in FIG. 2, the switching method includes the following steps.

201: A source network device receives N pieces of data channel quality information, where N is an integer greater than or equal to 1.

In this embodiment, to sift a suitable target network device for a terminal device, the source network device needs to learn of coverage quality of signals between a plurality of candidate network devices and the terminal device, so that the source network device may sift, for the terminal device, a network device that can meet a communication requirement of the terminal device. Therefore, the source network device may receive the N pieces of data channel quality information, where the N pieces of data channel quality information are in a one-to-one correspondence with N candidate network devices, and each of the N pieces of data channel quality information is used to indicate coverage quality of a data channel between the terminal device and a candidate network device corresponding to the data channel quality information.

It should be noted that in a specific switching scenario, an actual value of N varies. Optionally, N may be 1, 2, 3, 4, or an integer greater than 4. This is not specifically limited herein.

Specifically, the source network device may receive the N pieces of data channel quality information in the following two manners:

Manner 1: The source network device receives the N pieces of data channel quality information from the terminal device. Specifically, this manner is described in detail in an embodiment corresponding to FIG. 3.

Manner 2: The source network device receives one piece of data channel quality information from each of the N candidate network devices, to obtain the N pieces of data channel quality information. Specifically, this manner is described in detail in an embodiment corresponding to FIG. 4A and FIG. 4B.

Optionally, in addition to Manner 1 and Manner 2, the source network device may further receive the N pieces of data channel quality information in another manner. For example, the source network device may receive the N pieces of data channel quality information from a network management network element. This is not limited in the embodiments of this application.

Therefore, the source network device may analyze the N pieces of data channel quality information and perform determining Specifically, the source network device performs step 202.

202: The source network device determines one of the N candidate network devices as the target network device based on the N pieces of data channel quality information.

The target network device is a network device to which the terminal device is to be switched from the source network device.

Optionally, the target network device is a candidate network device in the N candidate network devices, where quality of the data channel between the candidate network device and the terminal device meets a specified condition (for example, optimal). Therefore, after the terminal device is switched from the source network device to the target network device, signal coverage quality at a position of the terminal device is improved, and a service rate of the terminal device is also improved.

Specifically, the source network device may determine that a candidate network device corresponding to a largest value in the N pieces of data channel quality information is the target network device. Specifically, detailed descriptions are provided in step 305 and step 405 in the following descriptions.

203: The source network device sends a switching request to the target network device.

In this embodiment, after determining the target network device, the source network device sends the switching request to the target network device, where the switching request is used to notify the target network device to prepare to connect to the terminal device.

204: Perform another switching procedure.

In this embodiment, after the source network device sends the switching request to the target network device, the source network device further performs the switching procedure, so that the terminal device can be switched from the source network device to the target network device. Details are not described herein.

It should be noted that step 203 and step 204 are optional steps. In addition to step 203 and step 204, the switching procedure may include another implementation. This is not limited in this embodiment of this application.

In this embodiment, the source network device may determine the target network device in the N candidate network devices based on the N pieces of data channel quality information. The data channel quality information may indicate the coverage quality of the data channel between the candidate network device and the terminal device. In addition, the service rate of the terminal device depends more on the coverage quality of the data channel than coverage quality of a broadcast channel Therefore, the target network device determined by the source network device can meet the communication requirement of the terminal device, so that the service rate of the terminal device can be improved.

Figure 3:
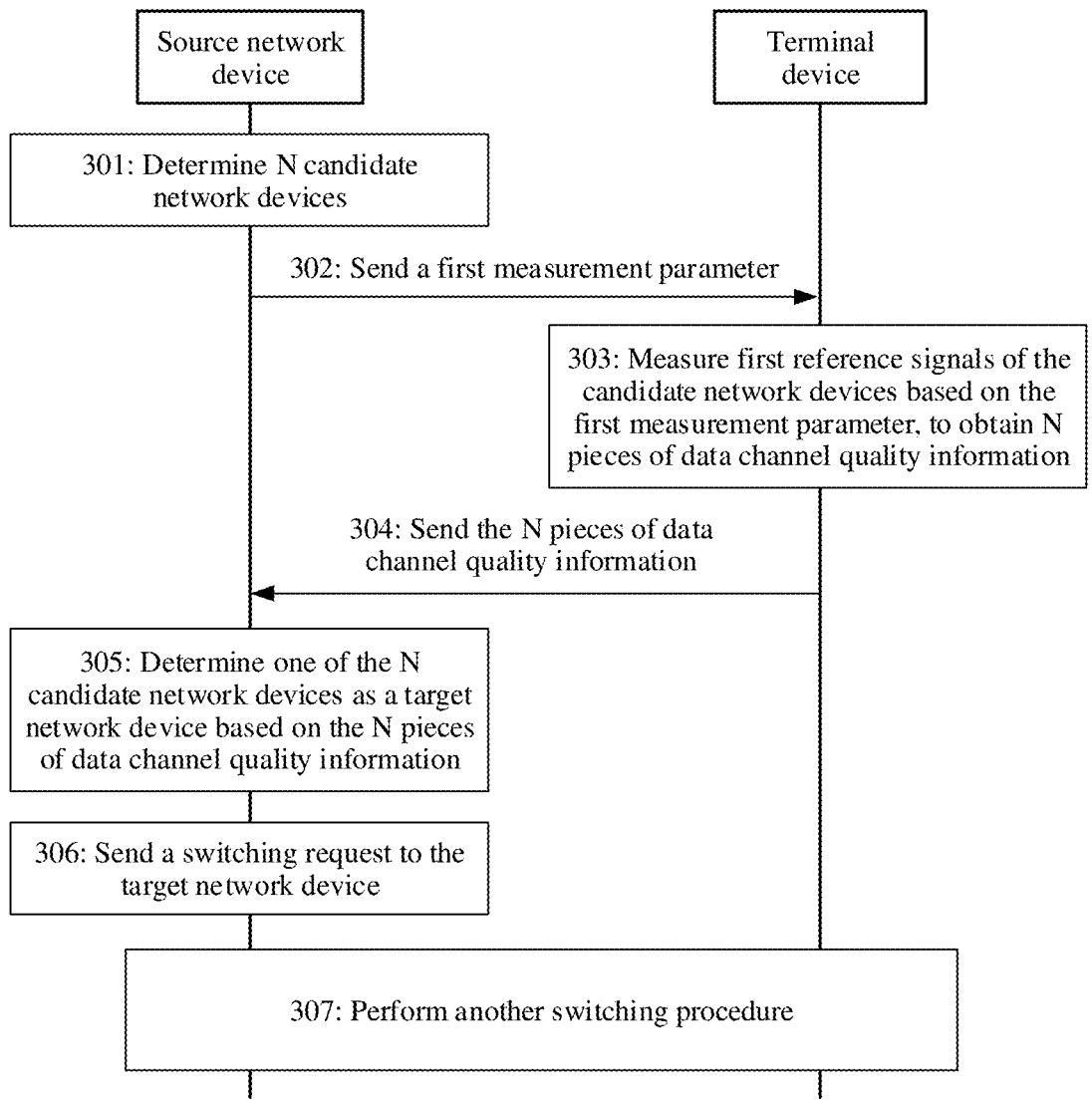
FIG. 3 is another flowchart of a switching method according to an embodiment of this application.

The foregoing describes the main procedure of the switching method proposed in the embodiments of this application. An example in which the source network device receives N pieces of data channel quality information from the terminal device is used below for detailed description. Specifically, as shown in FIG. 3, the source network device and the terminal device perform the following steps.

301: The source network device determines N candidate network devices.

Optionally, to sift a suitable target network device for the terminal device, the source network device may first sift at least one network device according to a specific rule, and perform further sifting on the at least one network device according to another rule. For example, the source network device may first sift at least one network device from a plurality of network devices other than the source network device. For ease of description, the at least one network device is referred to as a candidate network device. It should be understood that the candidate network device is merely a name of the at least one network device for ease of description, and is not specifically limited.

Specifically, the source network device may determine the N candidate network devices based on one or two of broadcast channel quality information and a neighboring relation table. For example, the source network device may determine the N candidate network devices in any one of the following manners.

Manner 1: The source network device determines the candidate network devices based on only the broadcast channel quality information.

The broadcast channel quality information is obtained by the terminal device through measurement according to an indication of the source network device. Specifically, the source network device sends a third measurement parameter to the terminal device, where the third measurement parameter includes resource position information of second reference signals of the candidate network devices and conditions for reporting measurement results corresponding to the second reference signals. Specifically, the resource position information of the second reference signal may be a frequency to be measured by the terminal device, namely, a frequency of the second reference signal of the candidate network device. Then, the terminal device measures, based on the third measurement parameter, the second reference signal of each candidate network device indicated by the third measurement parameter, to obtain the broadcast channel quality information. For ease of understanding, for example, information about the third measurement parameter indicates M+n third measurement parameters, and each third measurement parameter corresponds to a network device to be measured by the terminal device. During measurement, the terminal device determines that a network device meeting a reporting rule indicated in the third reporting rule information is a candidate network device. In an actual measurement process, a measurement result of a second measurement parameter of at least one network device may not meet the condition for reporting the measurement result corresponding to the second reference signal. Therefore, in this embodiment, a quantity of network devices that meet the condition for reporting the measurement result corresponding to the second reference signal and that are measured by the terminal device is M. Therefore, the terminal device may obtain M pieces of broadcast channel quality information, where each of the M pieces of broadcast channel quality information is used to indicate coverage quality of a broadcast channel between the terminal device and a candidate network device corresponding to the broadcast channel quality information.

In this embodiment, the source network device may determine the N candidate network devices based on the M pieces of broadcast channel quality information. Specifically, the source network device may sort the broadcast channel quality information in descending order of coverage quality of the broadcast channels, and determine that network devices corresponding to the first N pieces of broadcast channel quality information are the N candidate network devices, where N is an integer greater than or equal to 1.

Manner 2: The source network device determines the candidate network devices based on only the neighboring relation table.

The neighboring relation table is used to indicate a neighboring relation between a geographical position of the source network device and geographical positions of neighboring network devices. When signal coverage areas of two network devices overlap, the two network devices are usually configured as a neighboring relation during network deployment, and frequencies and other information of the two network devices are added to the neighboring relation table. Therefore, the neighboring relation table may reflect that the two network devices are neighboring network devices. When there is no obstruction between the terminal device and a network device, a shorter distance between the geographical position of the terminal device and the geographical position of the network device usually indicates better coverage quality of a channel between the terminal device and the network device. The terminal device is located near the source network device, and the neighboring network devices are also located near the source network device. Therefore, a geographical position relation between the terminal device and the neighboring network devices may be inferred based on a geographical position relation between the source network device and the neighboring network devices. Therefore, the source network device may determine, based on the neighboring relation table, that a plurality of network devices that are in the neighboring network devices and relatively close to the source network device are candidate network devices, and the geographical positions of the candidate network devices are near the geographical position of the terminal device. That the geographical positions of the candidate network devices are near the geographical position of the terminal device may be understood as that geographical distances between the candidate network devices and the terminal device are less than a threshold.

Manner 3: The source network device determines a candidate network device based on broadcast channel quality information and the neighboring relation table.

In this implementation, if the source network device may obtain both the broadcast channel quality information obtained by the terminal device through measurement and the neighboring relation table, the source network device may comprehensively consider the broadcast channel quality information and the neighboring relation table, to determine the candidate network devices.

Specifically, the source network device may first sift neighboring network devices that are located in the neighboring table and that have broadcast channel quality information. Then, the broadcast channel quality information of the neighboring network devices in the neighboring relation table is sorted in descending order of coverage quality of broadcast channels, and neighboring network devices corresponding to first N pieces of broadcast channel quality information of neighboring network devices in the neighboring relation table are determined as candidate network devices, where N is an integer greater than or equal to 1.

In this embodiment, the second reference signal of the candidate network device may be a synchronization signal block (synchronization signal block, SSB). In this case, the broadcast channel quality information obtained by the terminal device by measuring the second reference signal broadcast by the candidate network device includes one or more of a reference signal received power RSRP value of the SSB, a reference signal received quality RSRQ value of the SSB, and a signal to interference plus noise ratio SINR value of the SSB. It should be understood that any one of the RSRP value of the SSB, the RSRQ value of the SSB, and the SINR value of the SSB may reflect the coverage quality of the broadcast channel between the neighboring network device and the terminal device. A larger value of the broadcast channel quality information usually indicates better coverage quality of the broadcast channel between the neighboring network device and the terminal device. For example, a larger RSRP value of the SSB indicates that the coverage quality of the broadcast channel between the neighboring network device and the terminal device is better, and the neighboring network device more easily meets a communication requirement of the terminal device.

It should be understood that the coverage quality of the broadcast channel affects stability of accessing a network by the terminal device. When the coverage quality of the broadcast channel is lower than a threshold, the terminal device usually cannot access the network or the terminal device that has accessed the network is disconnected from the network. Therefore, the N candidate network devices sifted by the source network device based on the broadcast channel quality information help the terminal device access these candidate network devices, to ensure stability of accessing the network by the terminal device.

In this embodiment, after determining the candidate network device, the source network device requires the terminal device to perform further measurement on the candidate network device, to obtain coverage quality of a data channel between the terminal device and the candidate network device. Then, the source network device performs step 302.

302: The source network device sends a first measurement parameter to the terminal device.

In this embodiment, the source network device indicates the terminal device to further measure first reference signals of the N candidate network devices. Specifically, the source network device may send the first measurement parameter to the terminal device, to indicate an attribute needing to be measured by the terminal device.

Specifically, the first measurement parameter includes resource position information of the first reference signal of each of the N candidate network devices and a condition for reporting data channel quality information. The resource position information of the first reference signal is used to indicate a position of the first reference signal of the candidate network device, namely, a frequency of the first reference signal, and is also referred to as a frequency of the first reference signal, so that the terminal device can measure the first reference signal on the frequency. In addition, the condition for reporting data channel quality information is used to indicate a condition that needs to be met by the terminal device to report the data channel quality information. Specifically, the condition for reporting data channel quality information may be that the data channel quality information calculated by the terminal device is higher than a preset absolute threshold, or the data channel quality information calculated by the terminal device is higher than an offset threshold of a measurement result. This is not specifically limited herein.

In some feasible implementations, the first measurement parameter further includes a type of the first reference signal of each of the N candidate network devices, a frequency domain configuration and time domain configuration of the first reference signal of the candidate network device, and the like. This is not specifically limited herein. The type of the first reference signal of each candidate network device is a type of a reference signal indicating information about the coverage quality of the data channel. In this embodiment, the type of the first reference signal of each candidate network device may be a channel state information reference signal CSI-RS. In addition, the frequency domain configuration of the first reference signal of each candidate network device includes information such as a frequency domain position and distribution bandwidth, and the time domain configuration of the first reference signal of each candidate network device includes information such as a period in time domain, a slot in which the first reference signal is located, and a symbol position.

It should be further noted that the source network device may encapsulate the resource position information of the first reference signals of the N candidate network devices and the conditions for reporting the data channel quality information in a same message, and send the message to the terminal device. For example, the source network device may encapsulate the resource position information of the first reference signals of the N candidate network devices and the conditions for reporting the data channel quality information in radio resource control (radio resource control, RRC) signaling, and send the RRC signaling to the terminal device. During actual application, the source network device may alternatively encapsulate the resource position information of the first reference signals of the N candidate network devices and the conditions for reporting the data channel quality information in other signaling. This is not specifically limited herein. In addition, the source network device may alternatively encapsulate the resource position information of the first reference signal of each of the N candidate network devices and the condition for reporting data channel quality information in N messages separately, and send the N messages to the terminal device. This is not specifically limited herein. After receiving the first measurement parameter, the terminal device performs step 303.

303: The terminal device measures the first reference signals of the N candidate network devices based on the first measurement parameter, to obtain N pieces of data channel quality information.

Specifically, the terminal device measures N first to-be-measured attributes of the N candidate network devices based on the first measurement parameter, to obtain a plurality of first to-be-measured attribute values, for example, frequency domain positions of the CSI-RSs, distribution bandwidth of the CSI-RSs, and information such as periods of the CSI-RSs in time domain, slots in which the CSI-RSs are located, and symbol positions. Then, the terminal device may obtain a plurality of pieces of data channel quality information through calculation based on the plurality of first to-be-measured attribute values, and report, to the source network device, one or more pieces of data channel quality information that meets the condition for reporting data channel quality information. In this embodiment and subsequent embodiments, an example in which the terminal device reports the N pieces of data channel quality information is used for description. Specifically, each of the N pieces of data channel quality information may be at least one of a reference signal received power RSRP of the CSI-RS, reference signal received quality RSRQ of the CSI-RS, and a signal to interference plus noise ratio SINR of the CSI-RS. It should be understood that the RSRP of the CSI-RS, the RSRQ of the CSI-RS, or the SINR of the CSI-RS may reflect coverage quality of a data channel between the terminal device and a candidate network device corresponding to the data channel quality information. A larger value of the data channel quality information usually indicates better coverage quality of the data channel between the terminal device and the candidate network device corresponding to the data channel quality information. For example, a larger RSRP value of the CSI-RS indicates that the coverage quality of the data channel between the terminal device and the candidate network device corresponding to the data channel quality information is better, and the candidate network device more easily meets the communication requirement of the terminal device.

304: The terminal device sends the N pieces of data channel quality information to the source network device.

In this embodiment, after determining the data channel quality information of each of the N candidate network devices, the terminal device may encapsulate the N pieces of data channel quality information in a message, and send the message to the source network device. In some feasible implementations, the terminal device may alternatively send the data channel quality information by using a plurality of messages (for example, N messages, where each message carries one piece of data channel quality information). This is not specifically limited herein. In this case, after receiving the N pieces of data channel quality information sent by the terminal device, the source network device performs step 305.

305: The source network device determines one of the N candidate network devices as a target network device based on the N pieces of data channel quality information.

The target network device is a network device to which the terminal device is to be switched, and the target network device can meet the communication requirement of the terminal device.

In this embodiment, the data channel quality information may be one or more of the RSRP of the CSI-RS, the RSRQ of the CSI-RS, or the SINR of the CSI-RS. However, types of the N pieces of data channel quality information are usually the same. For example, if the data channel quality information is the RSRP of the CSI-RS, each of the N pieces of data channel quality information is the RSRP of the CSI-RS. In this embodiment, when data channel quality information received by the source network device is different, specific implementations of determining the target network device by the source network device are different. Descriptions are separately provided below.

Specifically, when the data channel quality information is any one of the RSRP of the CSI-RS, the RSRQ of the CSI-RS, or the SINR of the CSI-RS, the source network device determines that one network device in at least one candidate network device corresponding to a largest value in the N pieces of data channel quality information is the target network device. For ease of understanding, an example in which the data channel quality information is the RSRP of the CSI-RS is used for description.

In this case, the data channel quality information received by the source network device indicates RSRP values of CSI-RSs of different candidate network devices. Specifically, Table 1-1 is used as an example. Three pieces of data channel quality information received by the source network device are three RSRP values of CSI-RSs, and the three RSRP values of the CSI-RSs are respectively RSRP values of the CSI-RSs of different network devices. The terminal device measures a network device 1 in the candidate network devices, and obtains, through measurement, that an RSRP value of a CSI-RS of the network device 1 is −105 dBm. Similarly, an RSRP value of a CSI-RS of a network device 2 is −100 dBm, and an RSRP value of a CSI-RS of a network device 3 is −95 dBm. Because the RSRP value of the CSI-RS of the network device 3 is the largest, the source network device determines that the target network device is the network device 3 in the candidate network devices.

TABLE 1-1

| Candidate network device | RSRP value of the CSI-RS |
|---|---|
| Network device 1 | −105 dBm |
| Network device 2 | −100 dBm |
| Network device 3 | −95 dBm |

In another possible implementation, the source network device may determine the target network device based on both the broadcast channel quality information and the data channel quality information. Specifically, when the source network device determines that there are a plurality of largest values in the N pieces of data channel quality information, the source network device obtains, from historical storage records, broadcast channel quality information of candidate network devices corresponding to the plurality of largest values, and determines that a candidate network device corresponding to a largest value in the plurality of pieces of broadcast channel quality information is the target network device. For ease of understanding, an example in which broadcast channel quality information is an RSRP value of an SSB, and data channel quality information is an RSRP value of a CSI-RS is used for description. Specifically, Table 1-2 is used as an example. Three pieces of data channel quality information received by the source network device are three RSRP values of CSI-RSs. The RSRP value of the CSI-RS of the network device 1 is −105 dBm, the RSRP value of the CSI-RS of the network device 2 is −100 dBm, and the RSRP value of the CSI-RS of the network device 3 is −100 dBm. In this case, there are two largest values. Therefore, the source network device may obtain an RSRP value of an SSB of the network device 2 and an RSRP value of an SSB of the network device 3 from the historical storage records. Then, the source network device determines that the network device 2 corresponding to a largest RSRP value of the SSB is the target network device.

In such an implementation, the source network device may select a network device with better broadcast channel quality information and better data channel quality information as the target network device, so that communication quality of a user can be improved while the communication requirement of the terminal device is met.

TABLE 1-2

| Candidate network device | RSRP value of the CSI-RS | RSRP value of the SSB |
|---|---|---|
| Network device 1 | −105 dBm | −108 dBm |
| Network device 2 | −100 dBm | −102 dBm |
| Network device 3 | −100 dBm | −105 dBm |

In addition, when the data channel quality information is at least two of the RSRP of the CSI-RS, the RSRQ of the CSI-RS, or the SINR of the CSI-RS, the source network device needs to determine one of the at least two types of data channel quality information as to-be-referenced data channel quality information. Specifically, when determining the to-be-referenced data channel quality information, the source network device may preferentially consider the RSRP of the CSI-RS. Specifically, when the data channel quality information includes the RSRP of the CSI-RS, that is, when the data channel quality information is the RSRP of the CSI-RS and the RSRQ of the CSI-RS, or the RSRP of the CSI-RS and the SINR of the CSI-RS, or the RSRP of the CSI-RS, the RSRQ of the CSI-RS, and the SINR of the CSI-RS, the network device determines that the RSRP of the CSI-RS is the to-be-referenced data channel quality information. For example, when the data channel quality information includes the RSRP of the CSI-RS and the RSRQ of the CSI-RS, the source network device determines that the RSRP of the CSI-RS is the to-be-referenced data channel quality information. When the data channel quality information includes the RSRP of the CSI-RS and the SINR of the CSI-RS, the source network device determines that the RSRP of the CSI-RS is the to-be-referenced data channel quality information. In addition, when the data channel quality information does not include the RSRP of the CSI-RS, the source network device determines that the SINR of the CSI-RS is the to-be-referenced data channel quality information. For example, when the data channel quality information includes the RSRQ of the CSI-RS and the SINR of the CSI-RS, the source network device determines that the SINR of the CSI-RS is the to-be-referenced data channel quality information.

After determining the to-be-referenced data channel quality information, the source network device determines that one network device in at least one candidate network device corresponding to a largest value in the to-be-referenced data channel quality information is the target network device. Specifically, this is similar to the examples listed in Table 1-1 and Table 1-2 in this step. Details are not described herein again.

In some feasible implementations, when the data channel quality information is at least two of the RSRP of the CSI-RS, the RSRQ of the CSI-RS, or the SINR of the CSI-RS, the source network device may further sort the foregoing plurality of types of data channel quality information, and determine that one network device in at least one candidate network device corresponding to one or more pieces of data channel quality information meeting a preset sorting condition is the target network device. Specifically, the source network device separately sorts the foregoing at least two types of data channel quality information, and separately determines that a network device in an intersection set of candidate network devices corresponding to first several pieces of data channel quality information in descending order of data channel quality information is the target network device. For ease of understanding, an example in which the data channel quality information is the RSRP value of the CSI-RS and the SINR value of the CSI-RS is used for description. Specifically, Table 2-1 is used as an example. Six pieces of data channel quality information received by the source network device are three RSRP values of CSI-RSs and three SINR values of CSI-RSs. The RSRP values of the CSI-RSs sorted in descending order are: The RSRP value of the CSI-RS of the network device 2 is −100 dBm, the RSRP value of the CSI-RS of the network device 3 is −100 dBm, and the RSRP value of the CSI-RS of the network device 1 is −105 dBm. The SINR values of the CSI-RSs sorted in descending order are: The SINR of the CSI-RS of the network device 2 is 30 dB, the SINR value of the CSI-RS of the network device 1 is 20 dB, and the SINR value of the CSI-RS of the network device 3 is 10 dB. In this case, a largest value in the RSRP values of the CSI-RSs sorted in descending order corresponds to the network device 2 and network device 3. A largest value in the SINR values of the CSI-RSs sorted in descending order corresponds to the network device 2. Therefore, an intersection is the network device 2. Therefore, the source network device may determine that the target network device is the network device 2.

TABLE 2-1

| | Candidate network device | RSRP value of the CSI-RS | | Candidate network device | SINR value of the CSI-RS |
|---|---|---|---|---|---|
| CSI-RSRP values sorted in descending order | Network device 2 | −100 dBm | SINR values of the CSI-RSs sorted in descending order | Network device 2 | 30 dB |
| | Network device 3 | −100 dBm | | Network device 1 | 20 dB |
| | Network device 1 | −105 dBm | | Network device 3 | 10 dB |

Optionally, in a process in which the source network device determines the target network device in the candidate network devices based on the data channel quality information, the source network device may further determine whether the candidate network devices support a type of a service that is currently run on the terminal device. If the candidate network devices support the type of the service that is currently run on the terminal device, the source network device may consider determining one of the candidate network devices as the target network device in the manner in step 305.

306: The source network device sends a switching request to the target network device.

307: Perform another switching procedure.

In this embodiment, step 306 and step 307 are similar to the foregoing step 203 and step 204. Details are not described herein again.

It should be noted that step 306 and step 307 are optional steps. In addition to step 306 and step 307, the switching procedure may include another implementation. This is not limited in this embodiment of this application.

In this embodiment, the source network device determines the candidate network devices based on the broadcast channel quality information of the neighboring network devices that is sent by the terminal device, and further determines the target network device based on the data channel quality information of the candidate network devices. Therefore, the source network device determines the target network device based on both the broadcast channel quality information and the data channel quality information. In addition, the broadcast channel quality information may indicate the coverage quality of the broadcast channel, and the data channel quality information may indicate the coverage quality of the data channel Therefore, the target network device determined by the source network device can meet requirements of the terminal device on the coverage quality of the broadcast channel and the coverage quality of the data channel. Therefore, after the terminal device is switched from the source network device to the target network device, a service rate of the terminal device is provided.

Figure 4A:
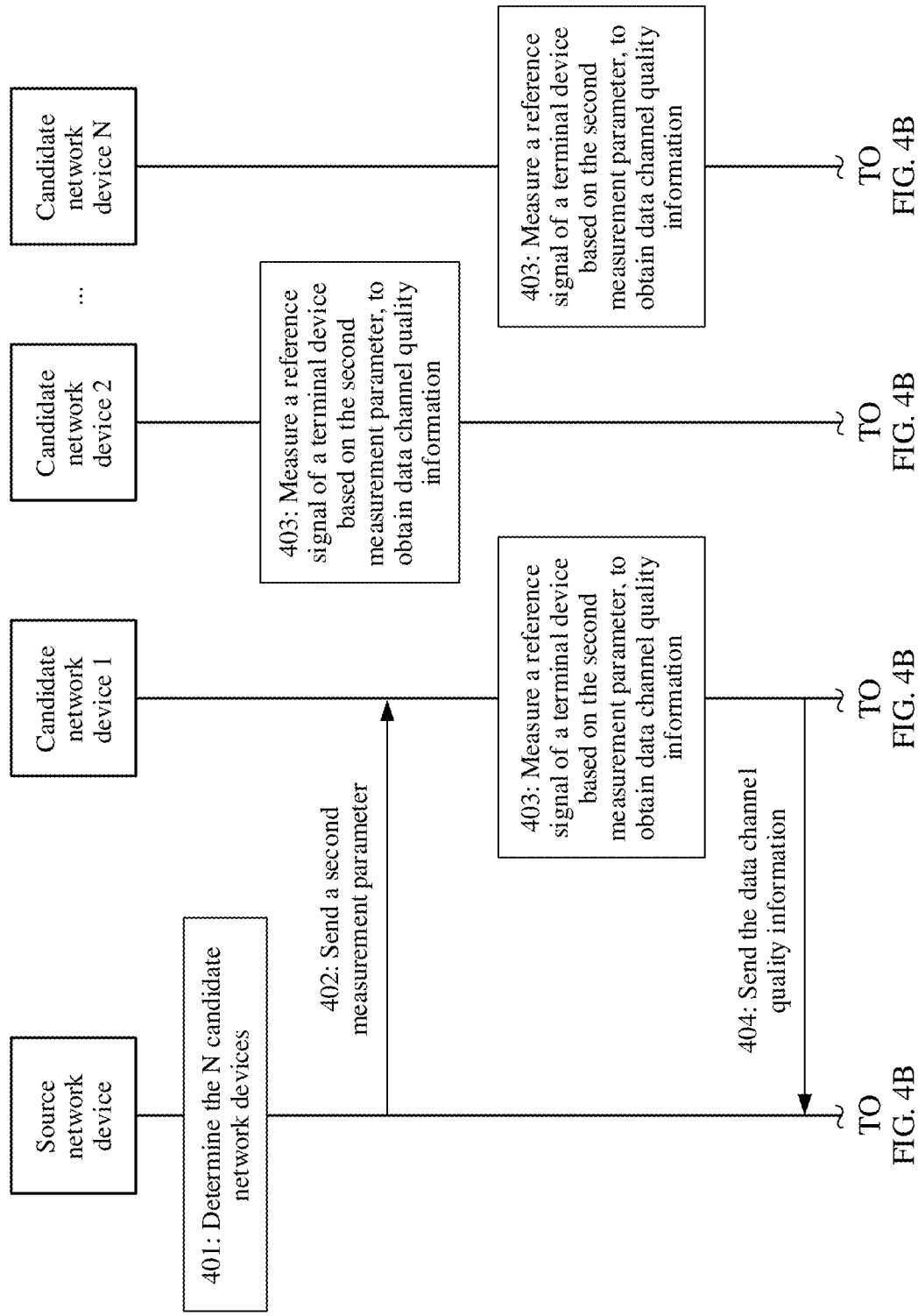

The foregoing describes an implementation in which the source network device receives the N pieces of data channel quality information from the terminal device. During actual application, the foregoing candidate network devices may further measure the terminal device. Therefore, the source network device may receive the N pieces of data channel quality information from the candidate network devices. This implementation is described in detail below. Specifically, as shown in FIG. 4A and FIG. 4B, a source network device, candidate network devices, and a terminal device perform the following steps.

401: The source network device determines N candidate network devices.

In this embodiment, step 401 is similar to the foregoing step 301. Details are not described herein again.

402: The source network device sends a second measurement parameter to each of the N candidate network devices.

In some feasible implementations, the second measurement parameter includes resource position information of a reference signal of the terminal device. The resource position information of the reference signal of the terminal device is used to indicate a position of the reference signal of the terminal device, namely, a frequency of the reference signal of the terminal device, and is also referred to as a frequency of the reference signal of the terminal device, so that the candidate network device can measure the reference signal of the terminal device on the frequency. The reference signal of the terminal device herein may be understood as a reference signal sent by the terminal device, namely, an uplink reference signal. Because the terminal has accessed the source network device, the source network device may learn of a resource position for sending the reference signal by the terminal device. Therefore, the source network device indicates, to each of the N candidate network devices, the resource position for sending the reference signal by the terminal device.

Optionally, the source network device may send the second measurement parameter through an interface between the source network device and each candidate network device, for example, an X2 interface or an Xn interface.

In this embodiment, the candidate network device measures the terminal device, and the candidate network device may already store information about a reporting rule, namely, a condition for reporting data channel quality information. Therefore, the second measurement parameter sent by the source network device to the terminal device may include only the resource position information of the reference signal of the terminal device, but does not include the information about a reporting rule.

In another feasible implementation, to avoid a case in which at least one candidate network device cannot send data channel quality information to the source network device when the information about a reporting rule does not exist, or the source network device needs to modify the information about a reporting rule, the second measurement parameter sent by the source network device to the candidate network device includes both the resource position information of the reference signal of the terminal device and the information about a reporting rule, namely, the condition for reporting data channel quality information. The condition for reporting data channel quality information is used to indicate a condition that needs to be met by the candidate network device to report the data channel quality information. Specifically, the condition for reporting data channel quality information may be that the data channel quality information calculated by the candidate network device is higher than a preset absolute threshold, or the data channel quality information calculated by the candidate network device is higher than an offset threshold of a measurement result. This is not specifically limited herein.

Optionally, the second measurement parameter further includes a type of the reference signal of the terminal device, a frequency domain configuration and time domain configuration of the reference signal of the terminal device, and the like. This is not specifically limited herein. The type of the reference signal of the terminal device is a type of a reference signal indicating information about coverage quality of a data channel. In this embodiment, the type of the reference signal of the terminal device is a sounding reference signal SRS. In addition, the frequency domain configuration of the reference signal of the terminal device includes information such as a frequency domain position and distribution bandwidth, and the time domain configuration of the reference signal of the terminal device includes information such as a period in time domain, a slot in which the reference signal is located, and a symbol position.

It should be further noted that the source network device may encapsulate the resource position information of the reference signal of the terminal device and the condition for reporting data channel quality information in a same message, and send the message to one candidate network device. For example, the source network device may encapsulate the resource position information of the reference signal of the terminal device and the condition for reporting data channel quality information in RRC signaling, and send the RRC signaling to the candidate network device. During actual application, the source network device may alternatively encapsulate the resource position information of the reference signal of the terminal device and the condition for reporting data channel quality information in other signaling. This is not specifically limited herein. After the candidate network device receives the second measurement parameter, the terminal device performs step 403.

It should be noted that there are N candidate network devices, and the N candidate network devices separately measure the reference signal of the terminal device. Therefore, when sending the second measurement parameter, the source network device sends the second measurement parameter to each of the N candidate network devices. Therefore, the source network device sends N second measurement parameters, where each second measurement parameter corresponds to one candidate network device.

403: Each candidate network device measures the reference signal of the terminal device based on the second measurement parameter, to obtain the data channel quality information.

The data channel quality information is used to indicate the coverage quality of the data channel between the candidate network device and the terminal device.

Specifically, when the second measurement parameter does not include the condition for reporting data channel quality information, the candidate network device measures a plurality of second to-be-measured attributes of the terminal device based on the second measurement parameter, to obtain a plurality of second to-be-measured attribute values, for example, a frequency domain position of the SRS, distribution bandwidth of the SRS, and information such as a period of the SRS in time domain, a slot in which the SRS is located, and a symbol position. Then, the candidate network device determines, based on a reporting condition stored inside the candidate network device and the first to-be-measured attribute values, the data channel quality information reported to the source network device.

Specifically, the data channel quality information may be at least one of a reference signal received power RSRP of the SRS and a signal to interference plus noise ratio SINR of the SRS. It should be understood that the RSRP of the SRS or the SINR of the SRS may reflect the coverage quality of the data channel between the terminal device and the candidate network device. A larger value of the data channel quality information usually indicates better coverage quality of the data channel between the terminal device and the candidate network device. For example, a larger RSRP value of the SRS indicates that the coverage quality of the data channel between the terminal device and the candidate network device is better, and the candidate network device more easily meets a communication requirement of the terminal device.

In addition, when the second measurement parameter includes the condition for reporting data channel quality information, after the terminal device obtains a plurality of third to-be-measured attribute values by measuring a plurality of third to-be-measured attributes of the terminal device based on the second measurement parameter, the terminal device determines the data channel quality information based on the condition that is for reporting the data channel quality information and sent by the terminal device. Specifically, this is similar to the foregoing descriptions. Details are not described herein again.

It should be understood that each of the N candidate network devices independently performs step 403, the candidate network devices shown in FIG. 4A and FIG. 4B are only a portion of the N candidate network devices, and a quantity of the candidate network devices shown in FIG. 4A and FIG. 4B does not limit the N candidate network devices mentioned in this embodiment.

404: Each candidate network device sends the data channel quality information to the source network device.

In this embodiment, after each of the N candidate network devices determines the data channel quality information, the candidate network device sends the data channel quality information to the source network device.

It should be understood that each of the N candidate network devices independently performs step 404, the candidate network devices shown in FIG. 4A and FIG. 4B are only a portion of the N candidate network devices, and a quantity of the candidate network devices shown in FIG. 4A and FIG. 4B does not limit the N candidate network devices mentioned in this embodiment.

Because each of the N candidate network devices independently performs step 404, the source network device may receive the N pieces of data channel quality information. After the source network device receives the data channel quality information sent by each of the N candidate network devices, the source network device performs step 405.

405: The source network device determines one of the N candidate network devices as a target network device based on the N pieces of data channel quality information.

The target network device is a network device to which the terminal device is to be switched, and the target network device can meet the communication requirement of the terminal device.

In this embodiment, the data channel quality information may be one or two of the RSRP of the SRS or the SINR of the SRS. Therefore, when data channel quality information received by the source network device is different, specific implementations of determining the target network device by the source network device are different. Descriptions are separately provided below.

Specifically, when the data channel quality information is any one of the RSRP of the SRS or the SINR of the SRS, the source network device determines that one network device in at least one candidate network device corresponding to a largest value in the data channel quality information is the target network device. For ease of understanding, an example in which the data channel quality information is the SINR of the SRS is used for description. As shown in Table 3-1, the data channel quality information includes three SINR values of SRSs. A network device 4 in the candidate network devices measures the terminal device, and obtains, through measurement, that a SINR value of the SRS between the network device 4 and the terminal device is 5 dB. Similarly, a SINR value of the SRS between a network device 5 and the terminal device is 8 dB, and a SINR value of the SRS between a network device 6 and the terminal device is 10 dB. The SINR value of the SRS between the network device 6 and the terminal device is the largest. Therefore, the source network device determines that the target network device is the network device 6 in the candidate network devices.

TABLE 3-1

| Candidate network device | SINR value of the SRS |
|---|---|
| Network device 4 | 5 dB |
| Network device 5 | 8 dB |
| Network device 6 | 10 dB |

In another possible implementation, the source network device may further determine the target network device based on both broadcast channel quality information and the data channel quality information. Specifically, when the source network device determines that there are a plurality of largest values in the N pieces of data channel quality information, the source network device obtains, from historical storage records, broadcast channel quality information of candidate network devices corresponding to the plurality of largest values, and determines that a candidate network device corresponding to a largest value in the plurality of pieces of broadcast channel quality information is the target network device. For ease of understanding, an example in which the broadcast channel quality information is an RSRP value of an SSB, and the data channel quality information is a SINR value of the SRS is used for description. Specifically, Table 3-2 is used as an example. The data channel quality information includes three SINR values of SRSs. The SINR value of the SRS between the network device 4 and the terminal device is 5 dB, the SINR value of the SRS between the network device 5 and the terminal device is 10 dB, and the SINR value of the SRS between the network device 6 and the terminal device is 10 dB. In this case, there are two largest values in the data channel quality information. Therefore, the source network device may obtain the RSRP value of the SSB of the network device 5 and the RSRP value of the SSB of the network device 6 from the historical storage records. Then, the source network device determines that the network device 5 corresponding to a largest RSRP value of the SSB is the target network device.

In such an implementation, the source network device may select a network device with better broadcast channel quality information and better data channel quality information as the target network device, so that communication quality of a user can be improved while the communication requirement of the terminal device is met.

TABLE 3-2

| Candidate network device | SINR value of the SRS | RSRP value of the SSB |
|---|---|---|
| Network device 4 | 5 dB | −105 dBm |
| Network device 5 | 10 dB | −95 dBm |
| Network device 6 | 10 dB | −100 dBm |

In addition, when the data channel quality information is the RSRP of the SRS and the SINR of the SRS, the source network device may preferentially consider the RSRP of the SRS. Specifically, the source network device determines that one network device in at least one candidate network device corresponding to a largest RSRP value of the SRS is the target network device. Specifically, this is similar to the foregoing step. Details are not described herein again.

In some feasible implementations, when the data channel quality information is the RSRP of the SRS and the SINR of the SRS, the source network device may further sort the foregoing plurality of types of data channel quality information, and determine that one network device in at least one candidate network device corresponding to one or more pieces of data channel quality information meeting a preset sorting condition is the target network device. Specifically, the source network device separately sorts the foregoing at least two types of data channel quality information, and separately determines that a network device in an intersection set of candidate network devices corresponding to first several pieces of data channel quality information in descending order of data channel quality information is the target network device. Specifically, this is similar to the example listed in Table 2-1. Details are not described herein again.

Optionally, in a process in which the source network device determines the target network device in the candidate network devices based on the data channel quality information, the source network device may further determine whether the candidate network devices support a type of a service that is currently run on the terminal device. If the candidate network devices support the type of the service that is currently run on the terminal device, the source network device may consider determining one of the candidate network devices as the target network device in the manner in step 405.

406: The source network device sends a switching request to the target network device.

407: Perform another switching procedure.

In this embodiment, step 406 and step 407 are similar to the foregoing step 203 and step 204. Details are not described herein again.

It should be noted that step 406 and step 407 are optional steps. In addition to step 406 and step 407, the switching procedure may include another implementation. This is not limited in this embodiment of this application.

In this embodiment, the source network device determines the candidate network devices based on the broadcast channel quality information of the neighboring network devices that is sent by the terminal device, and further determines the target network device based on the data channel quality information of the candidate network devices. Therefore, the source network device determines the target network device based on both the broadcast channel quality information and the data channel quality information. In addition, the broadcast channel quality information may indicate the coverage quality of the broadcast channel, and the data channel quality information may indicate the coverage quality of the data channel Therefore, the target network device determined by the source network device can meet requirements of the terminal device on the coverage quality of the broadcast channel and the coverage quality of the data channel. Then, a probability that the service rate of the terminal device is reduced because the network device cannot meet the communication requirement of the terminal device can be reduced.

Figure 5:
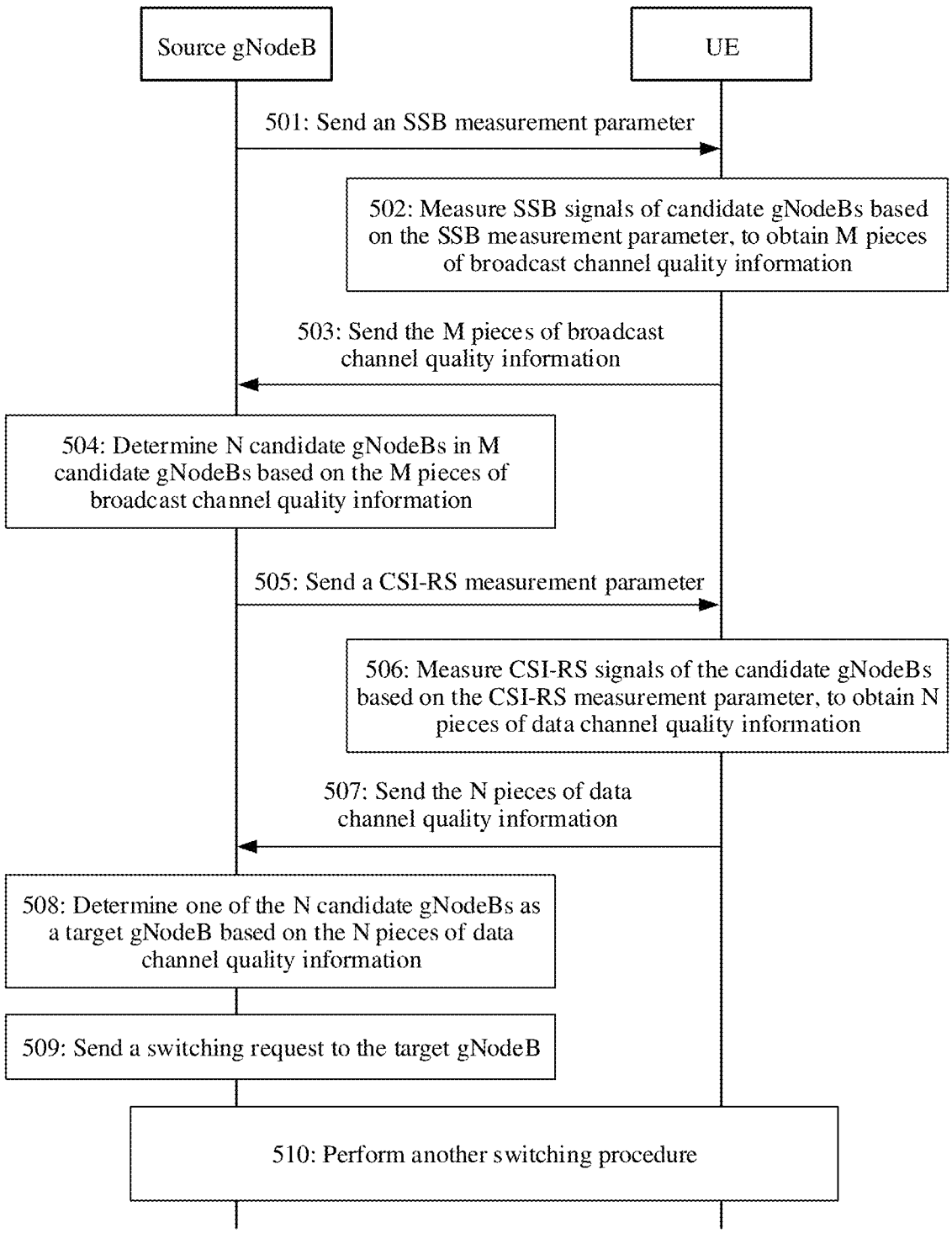
FIG. 5 is another flowchart of a switching method according to an embodiment of this application.

For ease of further understanding, the following describes the switching method with reference to a specific application scenario. As shown in FIG. 5, an example in which a terminal device is UE, a source network device is a source gNodeB, a candidate network device is a candidate gNodeB, a target network device is a target gNodeB, a second reference signal of the candidate network device is an SSB, and a first reference signal of the candidate network device is a CSI-RS is used for description.

It should be understood that a step performed by the source gNodeB in this embodiment may be combined with a step performed by the foregoing source network device, a step performed by the candidate gNodeB in this embodiment may be combined with a step performed by the foregoing candidate network device, and a step performed by the UE in this embodiment may be combined with a step performed by the foregoing terminal device. In some possible implementations, the source network device and the candidate network device may alternatively be access network devices or base stations of a subsequently evolved standard. This is not specifically limited herein.

The source gNodeB is a network device that provides a service for the UE, and a range in which the source gNodeB can provide the service is referred to as a serving cell. The target gNodeB is a network device that is sifted by the source gNodeB for the UE and that can meet a communication requirement of the UE. The candidate gNodeB is a network device that is selected by the source gNodeB and that may become a target gNodeB. Because the candidate gNodeB is usually distributed near the source gNodeB, a range in which the candidate gNodeB can provide a service is also referred to as a neighboring cell.

In this embodiment, in a moving process of the UE, the UE may have a switching requirement. For example, when the UE is located in an edge area of the source gNodeB, that is, when the UE is located in an edge area of the serving cell, coverage quality of a signal of the UE may not meet a service requirement of the UE. In this case, the UE needs to be switched from the gNodeB. For another example, the source gNodeB does not support a service to be performed by the UE, and the UE needs to be switched to a gNodeB that supports the service to be performed by the UE. Therefore, the source gNodeB requires the UE to measure a reference signal of each candidate gNodeB, so that the source gNodeB may determine, based on a measurement result of the reference signal of each candidate gNodeB by the UE, a target gNodeB suitable for the UE. Specifically, the source gNodeB and the UE perform the following steps.

501: The source gNodeB sends an SSB measurement parameter to the UE.

Specifically, the source gNodeB broadcasts the SSB measurement parameter to the UE at regular intervals, so that the UE measures SSB signals of candidate gNodeBs near the source gNodeB based on the SSB measurement parameter. The SSB measurement parameter includes information such as a frequency, signal type, time domain configuration, and frequency domain configuration of the SSB signal of the candidate gNodeB. The SSB measurement parameter further includes a condition for reporting data channel quality information corresponding to a parameter of the SSB. Specifically, this has been described in detail in step 301. Details are not described herein again.

It should be understood that the SSB measurement parameter may include information about a plurality of candidate gNodeBs. Therefore, the UE may measure the plurality of candidate gNodeBs, to sift at least one candidate gNodeB meeting the condition for reporting data channel quality information corresponding to a parameter of the SSB. Specifically, refer to step 502.

502: The UE measures the SSB signals of the candidate gNodeBs based on the SSB measurement parameter, to obtain M pieces of broadcast channel quality information.

Specifically, an example in which the SSB measurement parameter indicates M candidate gNodeBs is used for description. When the UE performs measurement, there are M candidate gNodeBs meeting the condition for reporting data channel quality information corresponding to a parameter of the SSB. Therefore, the UE may obtain the M pieces of broadcast channel quality information, where each of the M pieces of broadcast channel quality information is used to indicate coverage quality of a broadcast channel between the UE and a neighboring gNodeB corresponding to the broadcast channel quality information. M is an integer greater than or equal to 1. Specifically, this has been described in detail in step 301. Details are not described herein again.

503: The UE sends the M pieces of broadcast channel quality information to the source gNodeB.

In this embodiment, after the UE obtains the M pieces of broadcast channel quality information through measurement, the UE sends the M pieces of broadcast channel quality information to the source gNodeB, so that the source gNodeB performs further sifting on the M candidate gNodeBs corresponding to the M pieces of broadcast channel quality information.

504: The source gNodeB determines N candidate gNodeBs in the M candidate gNodeBs based on the M pieces of broadcast channel quality information.

Specifically, the source network device may sort the M pieces of broadcast channel quality information in descending order of coverage quality of the broadcast channels, and determine that network devices corresponding to the first N pieces of broadcast channel quality information are the N candidate gNodeBs, where N is less than M, and N is an integer greater than or equal to 1.

505: The source gNodeB sends a CSI-RS measurement parameter to the UE.

In this embodiment, the source gNodeB sends a parameter for measuring CSI-RSs of the N candidate gNodeBs to the UE. The CSI-RS measurement parameter includes information such as a frequency, signal type, time domain configuration, and frequency domain configuration of the CSI-RS signal of the candidate gNodeB. The CSI-RS measurement parameter further includes a condition for reporting data channel quality information corresponding to the CSI-RS. Specifically, this has been described in detail in step 302. Details are not described herein again.

Specifically, the source gNodeB may encapsulate the parameter for measuring CSI-RSs of the N candidate gNodeBs in one message and send the message to the UE, or may send the parameter to the UE by using a plurality of messages. This is not specifically limited herein.

506: The UE measures the CSI-RS signals of the candidate gNodeBs based on the CSI-RS measurement parameter, to obtain N pieces of data channel quality information.

In this embodiment, the UE measures the CSI-RS signal of each of the N candidate gNodeBs based on the CSI-RS measurement parameter, to obtain data channel quality information of the N candidate gNodeBs, that is, obtain the N pieces of data channel quality information. During actual application, there may also be a case in which a quantity of pieces of data channel quality information obtained by the UE through measurement is less than a quantity of the candidate gNodeBs. This is not specifically limited herein.

Specifically, each of the N pieces of data channel quality information may be at least one of RSRP of the CSI-RS, RSRQ of the CSI-RS, and a SINR of the CSI-RS. It should be understood that the RSRP of the CSI-RS, the RSRQ of the CSI-RS, or the SINR of the CSI-RS may reflect coverage quality of a data channel between the UE and a candidate gNodeB. A larger value of the data channel quality information usually indicates better coverage quality of the data channel between the UE and the candidate gNodeB. For example, a larger RSRP value of the CSI-RS indicates that the coverage quality of the data channel between the UE and the candidate gNodeB is better, and the candidate gNodeB more easily meets a communication requirement of the UE. Specifically, this has been described in detail in step 303. Details are not described herein again.

507: The UE sends the N pieces of data channel quality information to the source gNodeB.

In this embodiment, after determining the data channel quality information of each of the N candidate gNodeBs, the UE may encapsulate the N pieces of data channel quality information in a message, and send the message to the source gNodeB. In some feasible implementations, the UE may alternatively send the data channel quality information by using N messages. This is not specifically limited herein. In this case, after receiving the N pieces of data channel quality information sent by the UE, the source gNodeB performs step 508.

508: The source gNodeB determines one of the N candidate gNodeBs as a target gNodeB based on the N pieces of data channel quality information.

In this embodiment, the data channel quality information may be one or more of the RSRP of the CSI-RS, the RSRQ of the CSI-RS, or the SINR of the CSI-RS. However, the N pieces of data channel quality information are usually the same. For example, if the data channel quality information is the RSRP of the CSI-RS, each of the N pieces of data channel quality information is the RSRP of the CSI-RS.

Specifically, when the data channel quality information is any one of the RSRP of the CSI-RS, the RSRQ of the CSI-RS, or the SINR of the CSI-RS, the source gNodeB determines that one gNodeB in at least one candidate gNodeB corresponding to a largest value in the N pieces of data channel quality information is the target gNodeB. In another possible implementation, the source gNodeB may determine the target gNodeB based on both broadcast channel quality information and the data channel quality information. That is, when values of the data channel quality information are the same, a gNodeB whose broadcast channel quality information has a larger value is selected as the target gNodeB.

In such an implementation, the source gNodeB may select a gNodeB with better broadcast channel quality information and better data channel quality information as the target gNodeB, so that communication quality of a user can be improved while a communication requirement of the UE is met.

In addition, when the data channel quality information is at least two of the RSRP of the CSI-RS, the RSRQ of the CSI-RS, or the SINR of the CSI-RS, the source gNodeB needs to determine one of the at least two types of data channel quality information as to-be-referenced data channel quality information. Specifically, when determining the to-be-referenced data channel quality information, the source gNodeB may preferentially consider the RSRP of the CSI-RS. In addition, when the data channel quality information does not include the RSRP of the CSI-RS, the source gNodeB determines that the SINR of the CSI-RS is the to-be-referenced data channel quality information. For example, when the data channel quality information includes the RSRQ of the CSI-RS and the SINR of the CSI-RS, the source gNodeB determines that the SINR of the CSI-RS is the to-be-referenced data channel quality information.

After determining the to-be-referenced data channel quality information, the source gNodeB determines that one gNodeB in at least one candidate gNodeB corresponding to a largest value in the to-be-referenced data channel quality information is the target gNodeB. Specifically, this is similar to the examples listed in Table 1 and Table 2 in step 305. Details are not described herein again.

Optionally, in a process in which the source gNodeB determines the target gNodeB in the candidate gNodeBs based on the data channel quality information, the source gNodeB may further determine whether the candidate gNodeBs support a type of a service that is currently run on the UE. If the candidate gNodeBs support the type of the service that is currently run on the UE, the source gNodeB may consider determining one of the candidate gNodeBs as the target gNodeB in the manner in step 305.

509: The source gNodeB sends a switching request to the target gNodeB.

510: Perform another switching procedure.

In this embodiment, step 509 and step 510 are similar to the foregoing step 203 and step 204. Details are not described herein again.

It should be noted that step 509 and step 510 are optional steps. In addition to step 509 and step 510, the switching procedure may include another implementation. This is not limited in this embodiment of this application.

In this embodiment, because the source gNodeB determines the candidate gNodeBs based on measurement results of the SSBs that are of the gNodeBs and measured by the UE, and further determines the target gNodeB based on measurement results of the CSI-RSs that are of the gNodeBs and measured by the UE. Therefore, the source gNodeB determines the target gNodeB based on both the broadcast channel quality information and the data channel quality information. In addition, the broadcast channel quality information may indicate the coverage quality of the broadcast channel, and the data channel quality information may indicate the coverage quality of the data channel. Therefore, the target gNodeB determined by the source gNodeB may meet requirements of the UE on the coverage quality of the broadcast channel and the coverage quality of the data channel. Then, a probability that the service rate of the UE is reduced because the gNodeB cannot meet the communication requirement of the UE can be reduced.

Figure 6A:
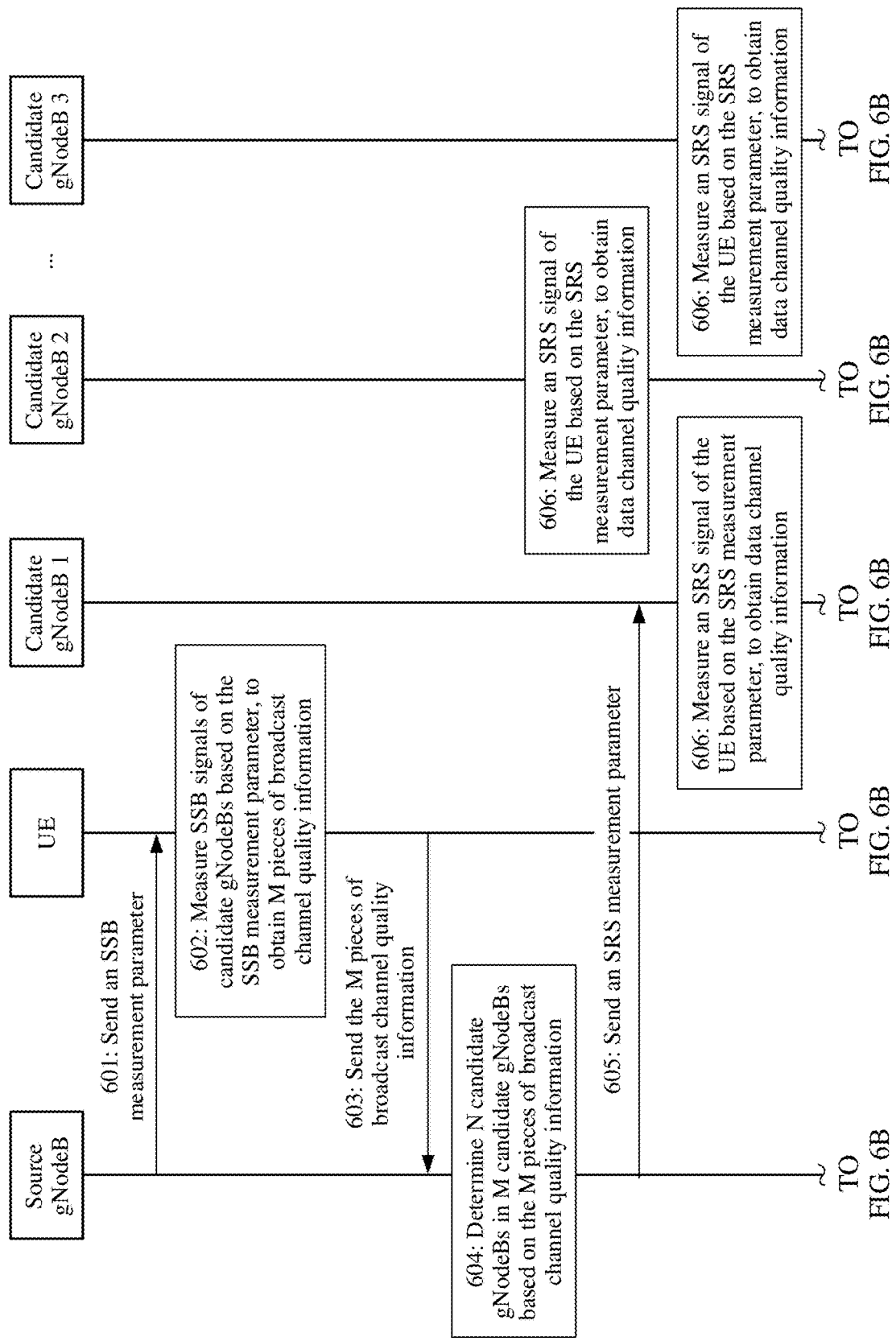

The data channel quality information described in the foregoing embodiment is obtained by the UE by measuring the CSI-RS signals of the candidate gNodeBs. During actual application, an SRS signal of the UE may also reflect the coverage quality of the data channel between the UE and the candidate gNodeB. Therefore, the N candidate gNodeBs may measure the SRS signal of the UE. Specifically, as shown in FIG. 6A and FIG. 6B, an example in which a terminal device is UE, a source network device is a source gNodeB, candidate network devices are candidate gNodeBs, a target network device is a target gNodeB, and a reference signal of the terminal device is an SRS is used.

It should be understood that a step performed by the source gNodeB in this embodiment may be combined with a step performed by the foregoing source network device, a step performed by the candidate gNodeBs in this embodiment may be combined with a step performed by the foregoing candidate network devices, and a step performed by the UE in this embodiment may be combined with a step performed by the foregoing terminal device. In some possible implementations, the source network device and the candidate network device may alternatively be access network devices or base stations of a subsequently evolved standard. This is not specifically limited herein.

Specifically, the source gNodeB, the candidate gNodeBs, and the UE perform the following steps.

601: The source gNodeB sends an SSB measurement parameter to the UE.

602: The UE measures an SSB signal of each candidate gNodeB based on the SSB measurement parameter, to obtain M pieces of broadcast channel quality information.

603: The UE sends the M pieces of broadcast channel quality information to the source gNodeB.

604: The source gNodeB determines N candidate gNodeBs in M candidate gNodeBs based on the M pieces of broadcast channel quality information.

In this embodiment, step 601 to step 604 are similar. For details, refer to the related descriptions of step 501 to step 504.

605: The source gNodeB sends an SRS measurement parameter to each candidate gNodeB.

In this embodiment, the source gNodeB sends, to each of the N candidate gNodeBs, the parameter for measuring an SRS of the UE. The parameter for measuring an SRS of the UE includes information such as a frequency, signal type, time domain configuration, and frequency domain configuration of the SRS signal of the UE. The parameter for measuring an SRS of the UE further includes a condition for reporting data channel quality information corresponding to the SRS. Specifically, this has been described in detail in step 302. Details are not described herein again.

Specifically, the source gNodeB may send, to the N candidate gNodeBs by using N messages, the parameter for measuring an SRS of the UE. It should be understood that coverage quality of a data channel between each of the N candidate gNodeBs and the UE may be different. Therefore, the parameter that is for measuring the SRS of the UE and received by each of the N candidate gNodeBs may be different.

606: Each candidate gNodeB measures the SRS signal of the UE based on the SRS measurement parameter, to obtain data channel quality information.

In this embodiment, the candidate gNodeB measures the SRS signal of the UE based on the SRS measurement parameter, to obtain the data channel quality information, where the data channel quality information is used to indicate coverage quality of a data channel between the candidate gNodeB and the UE. Specifically, the data channel quality information may be at least one of RSRP of the SRS and a SINR of the SRS. It should be understood that the RSRP of the SRS or the SINR of the SRS may reflect the coverage quality of the data channel between the UE and the gNodeB. A larger value of the data channel quality information usually indicates better coverage quality of the data channel between the UE and the candidate gNodeB. For example, a larger RSRP value of the SRS indicates that the coverage quality of the data channel between the UE and the candidate gNodeB is better, and the candidate gNodeB more easily meets a communication requirement of the UE.

Specifically, this has been described in detail in step 403. Details are not described herein again.

607: Each candidate gNodeB sends the data channel quality information to the source gNodeB.

In this embodiment, after each of the N candidate gNodeBs determines the data channel quality information of the UE, the candidate gNodeB sends the data channel quality information to the source gNodeB. Therefore, the source gNodeB may receive N pieces of data channel quality information. After receiving the N pieces of data channel quality information, the source gNodeB performs step 608.

608: The source gNodeB determines one of the N candidate gNodeBs as a target gNodeB based on the N pieces of data channel quality information.

In this embodiment, the data channel quality information may be one or two of the RSRP of the SRS or the SINR of the SRS. Therefore, when data channel quality information received by the source gNodeB is different, specific implementations for determining the target gNodeB by the source gNodeB are different. Descriptions are separately provided below.

Specifically, when the data channel quality information is any one of the RSRP of the SRS or the SINR of the SRS, the source gNodeB determines that one gNodeB in at least one candidate gNodeB corresponding to a largest value in the N pieces of data channel quality information is the target gNodeB.

In another possible implementation, the source gNodeB may determine the target gNodeB based on both broadcast channel quality information and the data channel quality information. In such an implementation, the source gNodeB may select a gNodeB with better broadcast channel quality information and better data channel quality information as the target gNodeB, so that communication quality of a user can be improved while a communication requirement of the UE is met.

In addition, when the data channel quality information is the RSRP of the SRS and the SINR of the SRS, the source gNodeB may preferentially consider the RSRP of the SRS. Specifically, the source gNodeB determines that one gNodeB in at least one candidate gNodeB corresponding to a largest RSRP value of the SRS is the target gNodeB. Specifically, this is similar to the foregoing step 405. Details are not described herein again.

Optionally, in a process in which the source gNodeB determines the target gNodeB in the candidate gNodeBs based on the data channel quality information, the source gNodeB may further determine whether the candidate gNodeBs support a type of a service that is currently run on the UE. If the candidate gNodeBs support the type of the service that is currently run on the UE, the source gNodeB may consider determining one of the candidate gNodeBs as the target gNodeB in the manner in step 405.

609: The source gNodeB sends a switching request to the target gNodeB.

610: Perform another switching procedure.

In this embodiment, step 609 and step 610 are similar to the foregoing step 203 and step 204. Details are not described herein again.

It should be noted that step 609 and step 610 are optional steps. In addition to step 609 and step 610, the switching procedure may include another implementation. This is not limited in this embodiment of this application.

In this embodiment, because the source gNodeB determines the candidate gNodeB based on measurement results of the SSBs that are of the gNodeBs and measured by the UE, and further determines the target gNodeB based on measurement results of the SRS that is of the UE and measured by the candidate gNodeBs. Therefore, the source gNodeB determines the target gNodeB based on both the broadcast channel quality information and the data channel quality information. Therefore, the target gNodeB determined by the source gNodeB may meet requirements of the UE on the coverage quality of the broadcast channel and the coverage quality of the data channel. Then, a probability that the service rate of the UE is reduced because the gNodeB cannot meet the communication requirement of the UE can be reduced.

Figure 7:
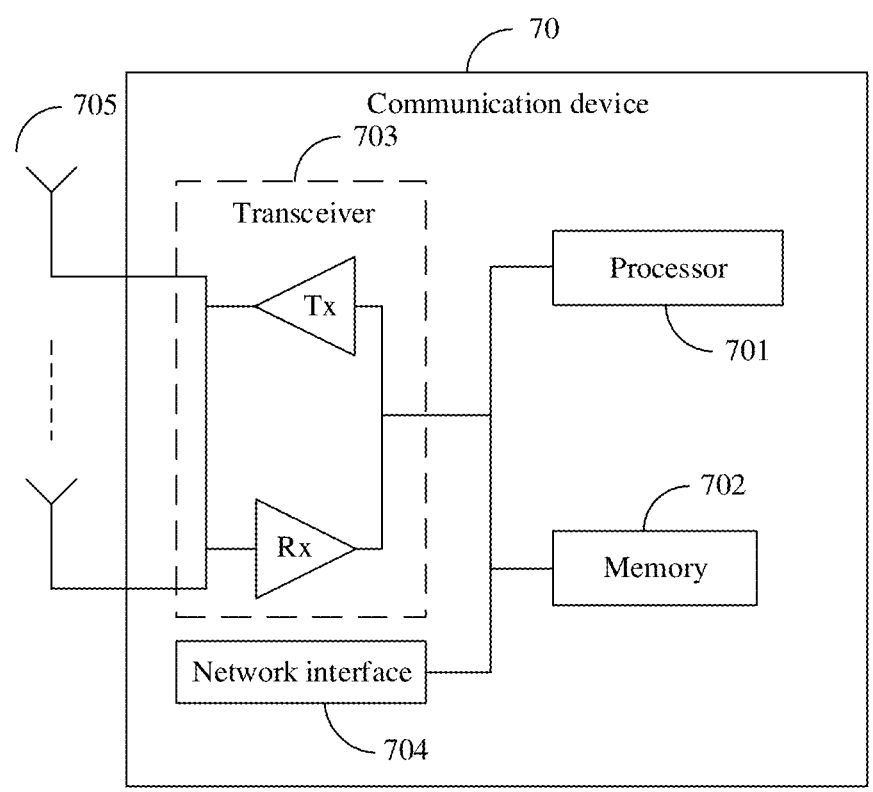
FIG. 7 is a schematic diagram of an embodiment of a communication device in a switching method according to an embodiment of this application.

FIG. 7 is a schematic diagram of a structure of a communication device 70 according to this embodiment. It should be understood that the source network device or the candidate network device in the method embodiments corresponding to FIG. 2 to FIG. 4A and FIG. 4B may be based on the structure of the communication device 70 shown in FIG. 7 in this embodiment. In addition, the source gNodeB or the candidate gNodeB in the method embodiments corresponding to FIG. 5 and FIG. 6A and FIG. 6B may be based on the structure of the communication device 70 shown in FIG. 7 in this embodiment. It should be further understood that, when a network device or a base station of a subsequently evolved standard performs the method in the embodiments of this application, the network device or the base station of the subsequently evolved standard may alternatively use the structure of the communication device 70 shown in FIG. 7 in this embodiment.

The communication device 70 includes at least one processor 701, at least one memory 702, at least one transceiver 703, at least one network interface 704, and one or more antennas 705. The processor 701, the memory 702, the transceiver 703, and the network interface 704 are connected by using a connection apparatus, and the antenna 705 is connected to the transceiver 703. The connection apparatus may include various types of interfaces, transmission cables, buses, or the like. This is not limited in this embodiment.

The network interface 704 is configured to connect the communication device 70 to another communication device by using a communication link. Specifically, the network interface 704 may include a network interface between the communication device 70 and a core network element, for example, an S1 interface. The network interface 704 may alternatively include a network interface between the communication device 70 and another network device (for example, another access network device or core network element), for example, an X2 or an Xn interface.

In addition, the processor 701 is mainly configured to process a communication protocol and communication data, control an entire network device, execute a software program, and process data of the software program, for example, configured to support the communication device 70 in performing an action described in the foregoing method embodiments. The communication device 70 may include a baseband processor and a central processing unit. The baseband processor is mainly configured to process the communication protocol and the communication data. The central processing unit is mainly configured to control the entire communication device 70, execute the software program, and process the data of the software program. Functions of the baseband processor and the central processing unit may be integrated into the processor 701 in FIG. 7. Persons skilled in the art may understand that the baseband processor and the central processing unit each may be an independent processor, and are interconnected by using a technology such as a bus. Persons skilled in the art may understand that the communication device 70 may include a plurality of baseband processors to adapt to different network standards, the communication device 70 may include a plurality of central processing units to improve a processing capability of communication device 70, and parts of the communication device 70 may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment, the memory 702 is mainly configured to store the software program and the data. The memory 702 may exist independently, and is connected to the processor 701. Optionally, the memory 702 and the processor 701 may be integrated, for example, integrated into one or more chips. The memory 702 can store program code for execution the technical solutions in the embodiments of this application, and the processor 701 controls the execution. Various types of executed computer program code may also be considered as drivers of the processor 701. It should be understood that FIG. 7 in this embodiment shows only one memory and one processor. However, during actual application, the communication device 70 may include a plurality of processor or a plurality of memory. This is not specifically limited herein. In addition, the memory 702 may also be referred to as a storage medium, a storage device, or the like. The memory 702 may be a storage element located on a same chip as the processor, namely, an on-chip storage element, or an independent storage element. This is not limited in the embodiments of this application.

In this embodiment, the transceiver 703 may be configured to support receiving or sending of a radio frequency signal between the communication device 70 and the terminal device, and the transceiver 703 may be connected to the antenna 705. The transceiver 703 includes a transmitter Tx and a receiver Rx. Specifically, the one or more antennas 705 may receive the radio frequency signal. The receiver Rx of the transceiver 703 is configured to: receive the radio frequency signal from the antenna 705, convert the radio frequency signal into a digital baseband signal or a digital intermediate frequency signal, and provide the digital baseband signal or the digital intermediate frequency signal to the processor 701, so that the processor 701 performs further processing, for example, demodulation processing and decoding processing, on the digital baseband signal or the digital intermediate frequency signal. In addition, the transmitter Tx in the transceiver 703 is further configured to: receive a modulated digital baseband signal or digital intermediate frequency signal from the processor 701, convert the modulated digital baseband signal or digital intermediate frequency signal into a radio frequency signal, and send the radio frequency signal by using the one or more antennas 705. Specifically, the receiver Rx may selectively perform one-level or multi-level down frequency mixing processing and analog-to-digital conversion processing on the radio frequency signal to obtain a digital baseband signal or a digital intermediate frequency signal, and a sequence of the down frequency mixing and the analog-to-digital conversion processing is adjustable. The transmitter Tx may selectively perform one-level or multi-level up frequency mixing processing and digital-to-analog conversion on the modulated digital baseband signal or digital intermediate frequency signal, to obtain the radio frequency signal. A sequence of the up frequency mixing processing and the digital-to-analog conversion is adjustable. The digital baseband signal and the digital intermediate frequency signal may be collectively referred to as a digital signal.

It should be understood that the transceiver 703 may also be referred to as a transceiver unit, a transceiver, a transceiver apparatus, or the like. Optionally, a component that is in the transceiver unit and configured to implement a receiving function may be considered as a receiving unit. A component that is in the transceiver unit and configured to implement a sending function may be considered as a sending unit. That is, the transceiver unit includes the receiving unit and the sending unit. The receiving unit may also be referred to as a receiver, an input port, a receiving circuit, or the like. The sending unit may be referred to as a transmitter, a transmitting machine, a transmitting circuit, or the like.

Figure 8:
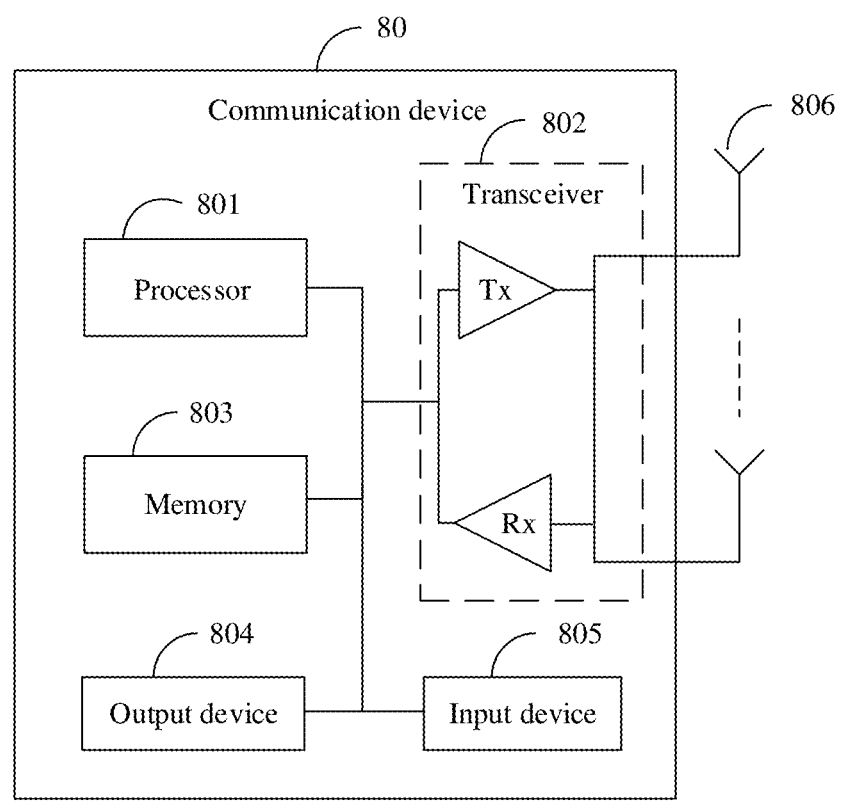
FIG. 8 is a schematic diagram of another embodiment of a communication device in a switching method according to an embodiment of this application.

FIG. 8 is a schematic diagram of a structure of another communication device 80 according to this embodiment. It should be understood that the terminal device in the method embodiments corresponding to FIG. 2 to FIG. 4A and FIG. 4B may be based on the structure of the communication device 80 shown in FIG. 8 in this embodiment. In addition, the UE in the method embodiments corresponding to FIG. 5 and FIG. 6A and FIG. 6B may be based on the structure of the communication device 80 shown in FIG. 8 in this embodiment.

The terminal device 80 includes at least one processor 801, at least one transceiver 802, and at least one memory 803. The processor 801, the memory 803, and the transceiver 802 are connected. Optionally, the terminal device 80 may further include an output device 804, an input device 805, and one or more antennas 806. The antenna 806 is connected to the transceiver 802, and the output device 804 and the input device 805 are connected to the processor 801.

For the transceiver 802, the memory 803, and the antenna 806, refer to the related descriptions in FIG. 7 to implement similar functions.

The processor 801 may be a baseband processor, or may be a central processing unit (central processing unit, CPU). The baseband processor and the CPU may be integrated together or separated. The processor 801 may be configured to implement various functions for the terminal device 80, for example, configured to process a communication protocol and communication data, or configured to: control the entire terminal device 80, execute a software program, and process data of the software program, or configured to assist in completing a computing processing task, for example, graphics and image processing or audio processing. Alternatively, the processor 801 is configured to implement one or more of the foregoing functions.

In addition, the output device 804 communicates with the processor 801, and may display information in a plurality of manners. For example, the output device 804 may be a liquid crystal display (liquid crystal display, LCD), a light emitting diode (light emitting diode, LED) display device, a cathode ray tube (cathode ray tube, CRT) display device, or a projector (projector). The input device 805 communicates with the processor 801, and may receive an input of a user in a plurality of manners. For example, the input device 805 may be a mouse, a keyboard, a touchscreen device, or a sensor device.

Figure 9:
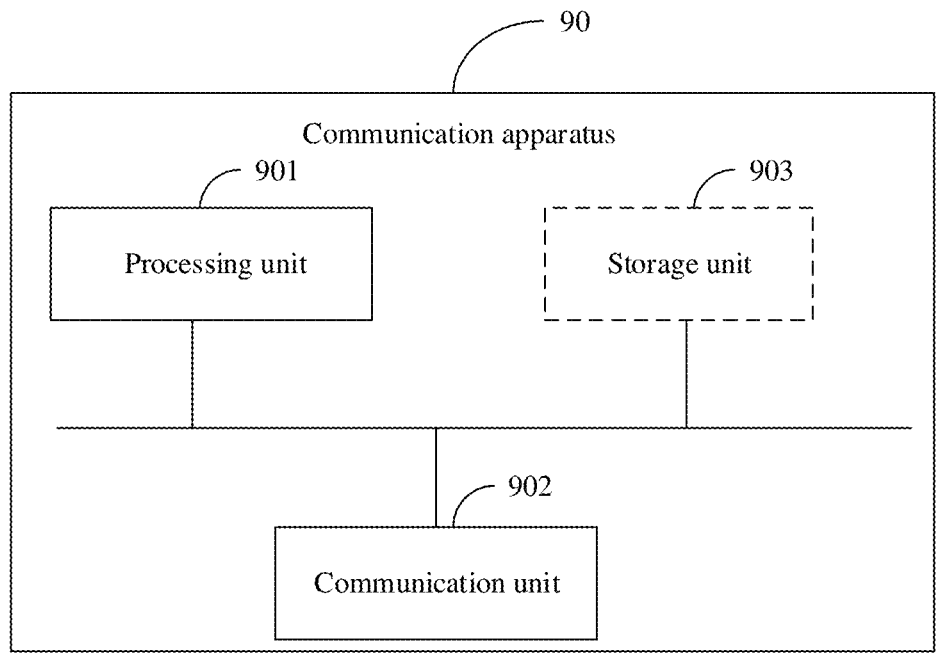
FIG. 9 is a schematic diagram of an embodiment of a communication apparatus in a switching method according to an embodiment of this application.

As shown in FIG. 9, this embodiment provides another communication apparatus 90. The communication apparatus 90 may be a source network device (or a source gNodeB), a candidate network device (or a candidate gNodeB), a chip in the source network device, or a chip in the candidate network device.

When the communication apparatus 90 is a source network device or a candidate network device, for a specific schematic diagram of a structure of the communication apparatus 90, refer to the structure of the communication device 70 shown in FIG. 7. Optionally, a communication unit 902 of the communication apparatus 90 may include the antenna and the transceiver of the communication device 70, for example, the antenna 705 and the transceiver 703 in FIG. 7. Optionally, the communication unit 902 may include a network interface, for example, the network interface 704 in FIG. 7.

When the communication apparatus 90 is a chip in the source network device, a chip in the source gNodeB, a chip in the candidate network device, or a chip in the candidate gNodeB in this embodiment of this application, the communication unit 902 may be an input or output interface, a pin, a circuit, or the like. A storage unit 903 may be a register, a cache, a RAM, or the like, and the storage unit 903 may be integrated with a processing unit 901. The storage unit 903 may be a ROM or another type of static storage device that can store static information and instructions, and the storage unit 903 may be independent of the processing unit 901. When the communication apparatus 90 is a network device or a chip in the network device, the processing unit 901 may complete the method performed by the source network device, the source gNodeB, the candidate network device, or the candidate gNodeB in the foregoing embodiments.

In a possible design, the processing unit 901 may include instructions. The instructions may be run on a processor, and the communication apparatus 90 is enabled to perform the method of the access network device in the foregoing embodiments.

In another possible design, the storage unit 903 stores instruction. The instructions may be run on the processing unit 901, and the communication apparatus 90 is enabled to perform the method of the source network device, the source gNodeB, the candidate network device, or the candidate gNodeB in the foregoing embodiments. Optionally, the storage unit 903 may further store data. Optionally, the processing unit 901 may further store instructions and/or data.

When the communication apparatus 90 is a chip in the source network device (or the source gNodeB) or a chip in the candidate network device (or the candidate gNodeB), the communication unit 902 or the processing unit 901 may perform the following steps:

For example, the communication unit 902 may receive N pieces of data channel quality information, and the processing unit 901 may determine one of the N candidate network devices as a target network device based on the N pieces of data channel quality information.

Optionally, the communication apparatus 90 may be a source network device (or a source gNodeB), and the communication unit 902 may receive the N pieces of data channel quality information from a terminal, for example, receive the N pieces of data channel quality information from the terminal by using the antenna 705 and the transceiver 703. Alternatively, the communication unit 902 may receive the N pieces of data channel quality information from N candidate network devices, for example, receive the N pieces of data channel quality information from the N candidate network devices by using the network interface 704.

For example, the processing unit 901 may determine that one network device in at least one candidate network device corresponding to a largest value in the N pieces of data channel quality information is the target network device.

For example, the communication unit 902 may send a first measurement parameter to the terminal device.

For others, refer to the method of the source network device or the source gNodeB in the foregoing embodiments. Details are not described herein again.

When the communication apparatus 90 is a candidate network device or a candidate gNodeB, the communication unit 902 or the processing unit 901 may perform the following steps:

For example, the communication unit 902 sends data channel quality information to a source network device.

For example, the communication apparatus 90 may be a source network device (or a source gNodeB), and may send data channel quality information through the network interface 704.

For example, the communication unit 902 receives a second measurement parameter sent by the source network device, and the processing unit 901 measures a reference signal of the terminal device based on the second measurement parameter, to obtain the data channel quality information.

For example, the communication apparatus 90 may be a source network device (or a source gNodeB), and may receive the second measurement parameter through the network interface 704.

For others, refer to the method of the candidate network device or the candidate gNodeB in the foregoing embodiments. Details are not described herein again.

Figure 10:
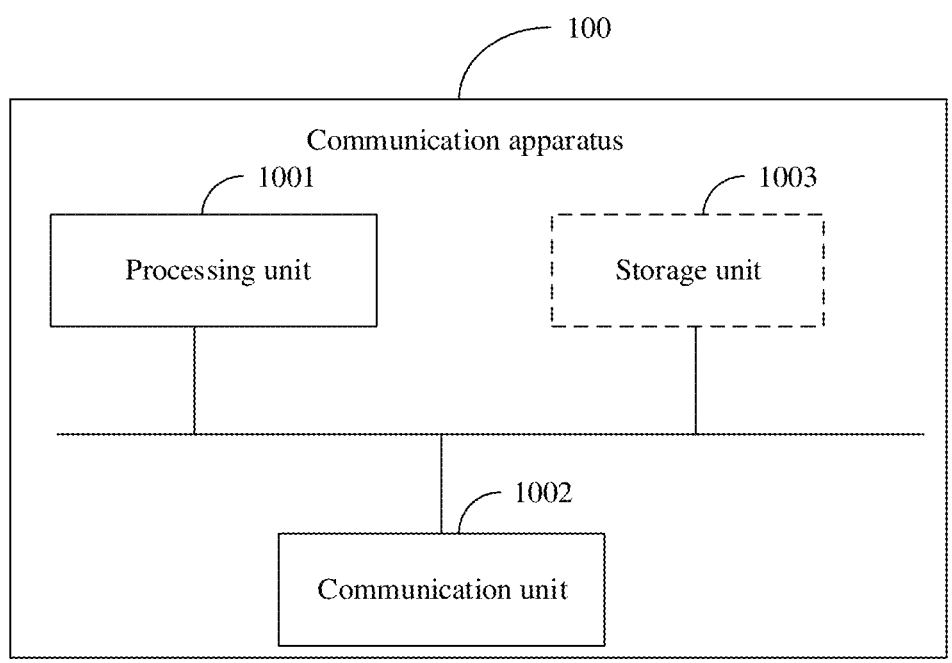
FIG. 10 is a schematic diagram of another embodiment of a communication apparatus in a switching method according to an embodiment of this application.

As shown in FIG. 10, this embodiment provides another communication apparatus 100. The communication apparatus 100 may be a terminal device (or UE) or a chip in the terminal device (or a chip in the UE).

When the communication apparatus 100 is a terminal device, for a specific schematic diagram of a structure of the communication apparatus 100, refer to the structure of the communication device 80 shown in FIG. 8. Optionally, a communication unit 1002 of the communication apparatus 100 may include the antenna and the transceiver of the communication device 80, for example, the antenna 806 and the transceiver 802 in FIG. 8.

When the communication apparatus 100 is a chip in the terminal device or a chip in the UE in this embodiment of this application, the communication unit 1002 may be an input or output interface, a pin, a circuit, or the like. A storage unit 1003 may be a register, a cache, a RAM, or the like, and the storage unit 1003 may be integrated with a processing unit 1001. The storage unit 1003 may be a ROM or another type of static storage device that can store static information and instructions, and the storage unit 1003 may be independent of the processing unit 1001. When the communication apparatus 100 is a network device or a chip in the network device, the processing unit 1001 may complete the method performed by the terminal device or the UE in the foregoing embodiments.

In a possible design, the processing unit 1001 may include instructions. The instructions may be run on a processor, and the communication apparatus 100 is enabled to perform the method of the access network device in the foregoing embodiments.

In another possible design, the storage unit 1003 stores instruction. The instructions may be run on the processing unit 1001, and the communication apparatus 100 is enabled to perform the method of the source network device, the source gNodeB, the candidate network device, or the candidate gNodeB in the foregoing embodiments. Optionally, the storage unit 1003 may further store data. Optionally, the processing unit 1001 may further store instructions and/or data.

When the communication apparatus 100 is a chip in a terminal device (or UE), the communication unit 1002 or the processing unit 1001 may perform the following steps:

For example, the communication unit 1002 may send N pieces of data channel quality information to a source network device.

Optionally, the communication apparatus 100 may be a terminal device (or UE), and the communication unit 1002 may send the N pieces of data channel quality information to the source network device, for example, send the N pieces of data channel quality information to the source network device by using the antenna 806 and the transceiver 802.

For example, the communication unit 1002 may receive a first measurement parameter sent by the source network device. The processing unit 1001 may measure a first reference signal of each of the N candidate network devices based on the first measurement parameter, to obtain the N pieces of data channel quality information.

Optionally, the communication apparatus 100 may be a terminal device (or UE), and may receive, by using the antenna 806 and the transceiver 802, the first measurement parameter sent by the source network device.

For others, refer to the method of the terminal device or the UE in the foregoing embodiments. Details are not described herein again.

It should be understood that the terminal device may include a function unit (means) corresponding to a step of the method or procedure of the terminal device, and the network device may include a function unit corresponding to a step of the method or procedure of the network device. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures.

The processor in this application may include but is not limited to at least one of the following: various computing devices that run software, for example, a central processing unit CPU, a microprocessor, a digital signal processor (digital signal processor, DSP), a microcontroller unit (microcontroller unit, MCU), or an artificial intelligence processor. Each computing device may include one or more cores for executing software instructions to perform calculation or processing. The processor may be an independent semiconductor chip, or may be integrated with another circuit into a semiconductor chip, for example, may be integrated with another circuit (such as a codec circuit, a hardware acceleration circuit, or various bus and interface circuits) to form a system-on-a-chip (system-on-a-chip, SoC), or may be integrated into the ASIC as a built-in processor of an application-specific integrated circuit (application specific integrated circuit, ASIC). The ASIC integrated with the processor may be independently packaged, or may be packaged together with another circuit. The processor includes a core configured to execute software instructions to perform calculation or processing, and may further include a necessary hardware accelerator, for example, a field programmable gate array (field programmable gate array, FPGA), a programmable logic device (programmable logic device, PLD), or a logic circuit that implements a special-purpose logic operation.

The memory in the embodiments of this application may include at least one type of the following: a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM). In some scenarios, the memory may alternatively be a compact disc read-only memory (compact disc read-only memory, CD-ROM), another compact disc storage, an optical disc storage (including a compressed optical disc, a laser disc, an optical disc, a digital versatile disc, a Blu-ray disc), a magnetic disk storage medium, another magnetic storage device, or any other medium that can be used to carry or store expected program code in a form of instructions or a data structure and that can be accessed by a computer. This is not limited thereto.

The bus may further include a power bus, a control bus, a status signal bus, and the like, in addition to a data bus. However, for clear description, various types of buses in the figures are marked as the bus.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor. To avoid repetition, details are not described herein again.

According to the method provided in the embodiments of this application, an embodiment of this application further provides a communication system, including the foregoing one or more network devices and one or more terminal devices.

It should be further understood that, "first", "second", "third", "fourth", and various numbers in this specification are merely used for differentiation for ease of description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Persons of ordinary skill in the art may be aware that, various illustrative logical blocks (illustrative logical blocks) and steps (steps) that are described with reference to the embodiments disclosed in this specification may be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A switching method, comprising:

receiving, by a source network device, M pieces of broadcast channel quality information from a terminal device, wherein the M pieces of broadcast channel quality information are in a one-to-one correspondence with M candidate network devices, and each of the M pieces of broadcast channel quality information is used to indicate coverage quality of a broadcast channel between the terminal device and a candidate network device of the M candidate network devices corresponding to the broadcast channel quality information, wherein M is an integer greater than or equal to 2;

determining, by the source network device, N candidate network devices based on broadcast channel quality information comprising the M pieces of broadcast channel quality information corresponding to the M candidate network devices, the N candidate network devices being in the M candidate network devices, wherein N is an integer greater than or equal to 1, and M is greater than or equal to N;

sending, by the source network device, a first measurement parameter to the terminal device, wherein the source network device receives the M pieces of broadcast channel quality information from the terminal device before sending the first measurement parameter to the terminal device, the first measurement parameter is used to indicate the terminal device to measure first reference signals of the candidate network devices, and the first measurement parameter comprises resource position information of the first reference signal of each of the N candidate network devices and a condition for reporting data channel quality information;

receiving, by the source network device, N pieces of data channel quality information from the terminal device, wherein the N pieces of data channel quality information are in a one-to-one correspondence with the N candidate network devices, each of the N pieces of data channel quality information is obtained by the terminal device by measuring a first reference signal of the candidate network device corresponding to the data channel quality information, and each of the N pieces of data channel quality information is used to indicate coverage quality of a data channel between the terminal device and a candidate network device of the N candidate network devices corresponding to the data channel quality information; and determining, by the source network device, based on the N pieces of data channel quality information, one of the N candidate network devices as a target network device to which the terminal device is to be switched from the source network device.

2. The method according to claim 1, wherein the data channel between the target network device and the terminal device is determined by the source network device as having optimal based on the data channel quality information corresponding to the target device having a greatest value among the N pieces of data channel quality information.

3. The method according to claim 1, wherein the first reference signal is a channel state information reference signal (CSI-RS), and each of the N pieces of data channel quality information comprises at least one of a reference signal received power (RSRP) value of the CSI-RS, a reference signal received quality (RSRQ) value of the CSI-RS, and a signal to interference plus noise ratio (SINR) value of the CSI-RS.

4. The method according to claim 3, wherein each of the N pieces of data channel quality information is any one of the RSRP value of the CSI-RS, the RSRQ value of the CSI-RS, and the SINR value of the CSI-RS; and the determining, by the source network device based on the N pieces of data channel quality information, one of the N candidate network devices as the target network device comprises:

determining, by the source network device, that the one candidate network device corresponds to a largest value in the N pieces of data channel quality information.

5. The method according to claim 1, wherein the determining, by the source network device, the N candidate network devices in the M candidate network devices based on the broadcast channel quality information comprises:

sorting, by the source network device, the M pieces of broadcast channel quality information in descending order of coverage quality of the broadcast channels; and determining that N candidate network devices corresponding to first N pieces of broadcast channel quality information are the N candidate network devices.

6. A switching method, comprising:

obtaining, by a terminal device, M pieces of broadcast channel quality information, wherein the M pieces of broadcast channel quality information are in a one-to-one correspondence with M candidate network devices, the M pieces of broadcast channel quality information are obtained by measuring a second reference signal of each of the M candidate network devices based on a third measurement parameter sent by a source network device, each of the M pieces of broadcast channel quality information is used to indicate coverage quality of a broadcast channel between the terminal device and a candidate network device of the M candidate network devices corresponding to the broadcast channel quality information, wherein M is an integer greater than or equal to 2;

sending, by the terminal device, broadcast channel quality information comprising the M pieces of broadcast channel quality information to the source network device to cause the source network device to determine N candidate network devices based on the broadcast channel quality information, wherein the broadcast channel information corresponds to the M candidate network devices, the N candidate network devices are in the M candidate network devices, the broadcast channel quality information based on which the source network device is caused to determine the N candidate network devices comprises the M pieces of broadcast channel quality information, N is an integer greater than or equal to 1, and M is greater than or equal to N;

receiving, by the terminal device, a first measurement parameter sent by the source network device, wherein the terminal device measures the second reference signal of each of the M candidate network devices based on the third measurement parameter sent by the source network device before receiving the first measurement parameter sent by the source network device, the first measurement parameter comprises resource position information of a first reference signal of each of the N candidate network devices and a condition for reporting data channel quality information;

measuring, by the terminal device, the first reference signal of each of the N candidate network devices based on the first measurement parameter, to obtain the N pieces of data channel quality information, wherein each of the N pieces of data channel quality information is obtained by the terminal device by measuring the first reference signal of the candidate network device corresponding to the data channel quality information; and sending, by the terminal device, N pieces of data channel quality information to the source network device to cause the source network device to determine, based on the N pieces of data channel quality information, one of the N candidate network devices as a target network device to which the terminal device is to be switched from the source network device, wherein the N pieces of data channel quality information are in a one-to-one correspondence with the N candidate network devices, and each of the N pieces of data channel quality information is used to indicate coverage quality of a data channel between the terminal device and a candidate network device of the N candidate network devices corresponding to the data channel quality information.

7. The method according to claim 6, wherein the data channel between the target network device and the terminal device is determined by the source network device as having optimal based on the data channel quality information corresponding to the target device having a greatest value among the N pieces of data channel quality information.

8. The method according to claim 6, wherein the first reference signal is a channel state information reference signal (CSI-RS), and each of the N pieces of data channel quality information comprises at least one of a reference signal received power (RSRP) value of the CSI-RS, a reference signal received quality value of the CSI-RS, and a signal to interference plus noise ratio value of the CSI-RS.

9. A communication apparatus for a terminal device, comprising:

a processor; and a non-transitory storage medium coupled to the processor and storing executable instructions that, when executed by the processor, cause the terminal device to:

obtain M pieces of broadcast channel quality information, wherein the M pieces of broadcast channel quality information are in a one-to-one correspondence with M candidate network devices, the M pieces of broadcast channel quality information are obtained by measuring a second reference signal of each of the M candidate network devices based on a third measurement parameter sent by a source network device, each of the M pieces of broadcast channel quality information is used to indicate coverage quality of a broadcast channel between the terminal device and a candidate network device of the M candidate network devices corresponding to the broadcast channel quality information, wherein M is an integer greater than or equal to 2;

send broadcast channel quality information comprising the M pieces of broadcast channel quality information to the source network device to cause the source network device to determine N candidate network devices based on the broadcast channel quality information, wherein the broadcast channel information corresponds to M candidate network devices, the N candidate network devices are in the M candidate network devices, the broadcast channel quality information based on which the source network device is caused to determine the N candidate network devices comprises the M pieces of broadcast channel quality information, N is an integer greater than or equal to 1, and M is greater than or equal to N;

receive a first measurement parameter sent by the source network device, wherein the terminal device measures the second reference signal of each of the M candidate network devices based on the third measurement parameter sent by the source network device before receiving the first measurement parameter sent by the source network device, the first measurement parameter comprises resource position information of a first reference signal of each of the N candidate network devices and a condition for reporting data channel quality information;

measure the first reference signal of each of the N candidate network devices based on the first measurement parameter, to obtain the N pieces of data channel quality information, wherein each of the N pieces of data channel quality information is obtained by the terminal device by measuring the first reference signal of the candidate network device corresponding to the data channel quality information; and send N pieces of data channel quality information to the source network device to cause the source network device to determine, based on the N pieces of data channel quality information, one of the N candidate network devices as a target network device to which the terminal device is to be switched from the source network device, wherein the N pieces of data channel quality information are in a one-to-one correspondence with the N candidate network devices, and each of the N pieces of data channel quality information is used to indicate coverage quality of a data channel between the terminal device and a candidate network device of the N candidate network devices corresponding to the data channel quality information.

10. The apparatus according to claim 9, wherein the data channel between the target network device and the terminal device is determined by the source network device as having optimal based on the data channel quality information corresponding to the target device having a greatest value among the N pieces of data channel quality information.

11. The apparatus according to claim 9, wherein the first reference signal of the candidate network device is a channel state information reference signal (CSI-RS), and each of the N pieces of data channel quality information comprises at least one of a reference signal received power (RSRP) value of the CSI-RS, a reference signal received quality value of the CSI-RS, and a signal to interference plus noise ratio value of the CSI-RS.

* * * * *